United States Patent [19]

Alden

[11] Patent Number: 5,418,888

[45] Date of Patent: May 23, 1995

[54] SYSTEM FOR REVELANCE CRITERIA MANAGEMENT OF ACTIONS AND VALUES IN A RETE NETWORK

[76] Inventor: John L. Alden, 7258-91st SE., Mercer Island, Wash. 98040

[21] Appl. No.: 894,353

[22] Filed: Jun. 4, 1992

[51] Int. Cl.$^6$ .............................................. G06F 15/18
[52] U.S. Cl. ........................ 395/64; 395/600; 395/50; 395/52; 395/63; 364/DIG. 1; 364/274; 364/274.2
[58] Field of Search .................... 395/64, 600, 50, 52, 395/63

[56] References Cited

U.S. PATENT DOCUMENTS

| | | | |
|---|---|---|---|
| 4,849,905 | 7/1989 | Loeb et al. | 395/64 |
| 5,072,405 | 12/1991 | Ramakrisna et al. | 395/64 |
| 5,119,470 | 6/1992 | Highland et al. | 395/64 |

Primary Examiner—Thomas G. Black
Assistant Examiner—Wayne Amsbury
Attorney, Agent, or Firm—Graybeal Jackson Haley & Johnson

[57] ABSTRACT

A method for programming a computer, and software products for implementing the method, are disclosed. According to the method, objects are created which, upon execution of the system, may initiate actions and may acquire values. A specification of relevance criteria is stored as an attribute of each object. Relevance criteria, which may refer to the values of other objects, describe all conditions necessary and sufficient to make the binary decision for whether the object will be considered relevant to the program's operation during execution. Action criteria may also be specified to control the actions of a relevant object. The method is particularly well suited for programming expert systems, but may be used for programming any type of computer program.

22 Claims, 11 Drawing Sheets

KNOWLEDGE BASS STRUCTURE

GENERATED DATA FILE STRUCTURE

FIG. 7
CONTROL STRINGS STRUCTURE
OBJECT FIRING CONTROL STRING
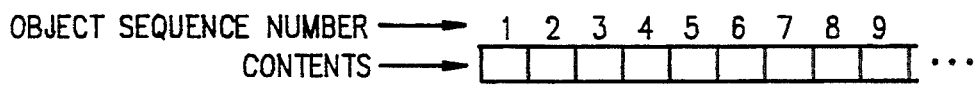
STATEMENT TRUTH CONTROL STRING
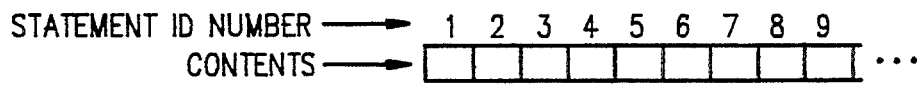
DEFAULT VALUES CONTROL STRING
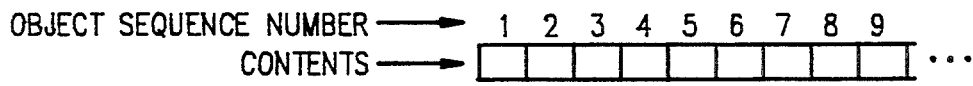
OBJECT ADDRESS CONTROL STRING
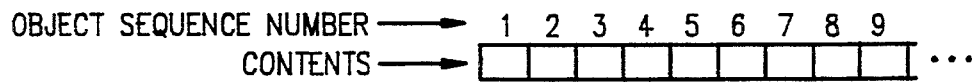
STATEMENT ADDRESS CONTROL STRING
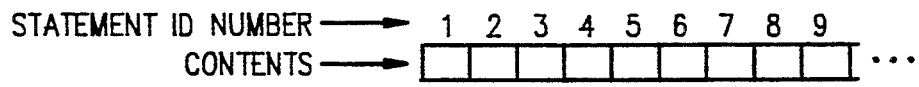

FIG. 12

VALIDATION TABLE

TEST CASE NUMBERS → OBJECT SHOULD NOT FIRE IN THESE TEST CASES | OBJECT SHOULD FIRE IN THIS TEST CASE

|   | 1 | 2 | 3 | 4 | 5 | 6 |
|---|---|---|---|---|---|---|
| 1 | N | Y | Y | Y | Y | Y |
| 2 | 12 | 7 | 12 | 12 | 12 | 12 |
| 3 | N | N | Y | N | N | N |
| 4 | LOW | LOW | LOW | HIGH | LOW | LOW |
| 5 | 5 | 5 | 5 | 5 | 3 | 5 |
| 6 | 3 | 3 | 3 | 3 | 5 | 3 |

OBJECT ID NUMBERS ↓

OBJECT DEPENDENCY (A REFERENCED UPSTREAM OBJECT)

OBJECT VALUE ASSIGNMENTS TO SATISFY REQUIREMENTS OF TEST CASES. DIAGONAL BAND SHOWS VALUES THAT CAUSE OBJECT NOT TO FIRE.

RELEVANCE CRITERIA FOR ABOVE VALIDATION TABLE

| LOGICAL OPERATOR | LEFT EXPRESSION | OPERATOR | RIGHT EXPRESSION |
|---|---|---|---|
|  | {OBJECT 1} | = | YES |
| AND | {OBJECT 2} | > | 10 |
| AND | {OBJECT 3} | = | NO |
| AND | {OBJECT 4} | # | HIGH |
| AND | {OBJECT 5} | >= | {OBJECT 6} |

A VALIDATION TABLE IS CONTRUCTED FOR EACH CRITERIA PATHWAY. AN "OR" CONDITION CREATES MULTIPLE PATHWAYS, EACH OF WHICH WILL HAVE ITS OWN DEDICATED VALIDATION TABLE. WITHIN A PATHWAY, ALL STATEMENTS ARE LINKED BY "AND".

SYSTEM FOR REVELANCE CRITERIA MANAGEMENT OF ACTIONS AND VALUES IN A RETE NETWORK

BACKGROUND

The invention pertains to methods for programming computers and the software tools for implementing these methods.

Early computer programming methods were limited to procedure based languages in which the actions of the computer were controlled by a long sequence from beginning to end. During execution of the sequence, control might be passed from one program to another which was specified by the first program and then control might be returned to the original program or might continue on to a third. In any event, control followed a sequence established by the programmer.

In order to model the reasoning processes of human experts, expert computer systems were devised which included long lists of facts and long lists of rules stating inferences that might be drawn if and when certain facts exist. When a rule is satisfied, consequences will typically cause the specification or updating of some of the facts. These changed facts will then cause other rules to become satisfied and the choice must again be made of which rule to apply next. In such rule-based systems, there are typically many different rules which are satisfied by any given condition of the set of facts and the application of one rule ahead of another will frequently cause a difference in the result or the speed at which it is achieved.

For this reason, and also because the numbers of rules are so large, applying every rule which is satisfied in each iteration of the system would be prohibitively slow, considerable research and experimentation has been devoted to developing "control strategies" and "inferencing methods" for determining which of the rules should be applied when. For a given set of facts and a given set of rules, different control strategies will produce different results or will reach the results with different efficiencies.

The creation of rule-based expert systems is a complex task, typically requiring a "knowledge engineer" to work with an expert to translate the expertise into long lists of potentially relevant facts and long lists of rules. Once the system is built, it is difficult to verify that the system will produce correct results in each situation and it is difficult to analyze the exact steps taken by the system to achieve each result.

Another architecture for modeling human expertise in computers uses "frames" or "objects" to represent items or classes of items in the real world, and then allows "children" of those frames or objects to be defined which inherit characteristics of their "parents" but are further differentiated from their "siblings" with additional information. Such a system is quite effective for representing taxonomic knowledge such as the method of organizing animal life into kingdoms, phyla, classes, orders, families, genera, and species.

SUMMARY OF THE INVENTION

The invention is a novel method of programming a computer system and the various software tools and components which implement this method. Although the method was developed to meet the need for improved expert systems, it has been discovered that the method is also useful for programming many other types of computer systems and is not limited to use for expert systems.

A fundamental concept of the invention is that of the "object": a necessary fact, a calculated result, a conclusion, or an identifiable element of the expert analysis that is being modeled. Experts do not use the term "objects", but they work with such objects all the time. When human experts use their expertise to solve a problem in the domain being modeled, they think by manipulating such objects. They ask questions to acquire necessary facts for their analysis; they calculate results; they come to intermediate conclusions, which affect their later reasoning; and they calculate or conclude final answers or recommendations. What makes them experts at solving such problems is that they have a long-standing familiarity with these elements of their analysis and they know the relationships among them. They know what questions to ask under what circumstances, and what consequences flow from which facts.

Although this description of the invention employs the word "objects", the meaning of this word has little in common with the "objects" of prior art expert systems.

The invention is designed to eliminate the "knowledge engineer", who serves in conventional expert systems as an intermediary between the domain expert and the system being built. The expert is typically not a computer programmer, and cannot be expected to know how to model his expertise in software, using conventional languages or expert system shells. The knowledge engineer, in the building of a typical expert system, forms this crucial link between the expertise to be modeled and the computer programming that is usually required in order to model it. The knowledge engineer interviews the expert to elicit the expertise and knowledge, and then applies his or her own computer programming expertise to represent that knowledge in the software. Unfortunately, there is enormous potential for error in this process, and it can be frustrating and expensive for all concerned.

The invention allows an expert to model expertise directly in the software. The object paradigm is intuitive enough that most experts take to it relatively easily, and can design their own systems first-hand. To create a knowledge base, one simply creates objects and then specifies the relationships among them in order to perform the analysis. The analysis happens in a specific sequence specified by the expert. This exactly mirrors one of the ways experts solve problems in the real world: they start by acquiring relevant facts, and then "reason forward" in some way from those facts to arrive at the consequences that flow from them. Each fact, consequence and all other factors which are useful in the course of the analysis become objects in the knowledge base.

During execution of a consultation, as facts are acquired from the user, some objects will turn out to be important, while others will be found to be irrelevant to the analysis and therefore will be ignored. In this way the system responds flexibly to different inputs and thereby effectively replicates in software the expertise of the designing expert.

Distinguishing features of the knowledge representation method are that:

(1) Action in the system takes the form of evaluating and firing objects, rather than firing rules as in prior art systems. Objects and their appropriate behavior, rather than rules and search strategies for applying them, become the central focus of system design.

(2) When an object fires, among other possible actions, it can set a value for itself.

(3) Knowledge is represented by objects and a description of what factors can affect the relevance and appropriate actions of objects. For most of the objects, the relevance criteria include references to values set for themselves by previously fired objects.

(4) The description of all such factors that could affect an object's relevance and appropriate actions are collected in only one place in the form of a set of evaluatable statements associated with the object, the object's behavior criteria.

A distinguishing label for this method is "relevance-actions-value based programming".

The knowledge being represented in the system thus takes the form of an enumeration of the instructions necessary to make a binary decision: whether to take action with respect to an object. The significance of that decision for the analysis being modeled lies in the inherent meaning of the object itself, as intended by the system designer, and in the inter-object dependency relationships that are created by these relevance criteria instructions.

There are important distinctions between the relevance criteria of the present invention and rules of the prior art. Prior art rules are organized in a long list, sometimes with groupings for ease of management, separately from the database of "facts" or "objects". The central question is, given the set of facts, which of many rules that could be applied should be applied? Different search strategies for choosing the rule to be applied can produce different results. New rules can be added at any time without changing existing rules.

In contrast, in the present invention, there is no search for applicable rules. Each object is considered in its turn and its relevance criteria are evaluated. Although the relevance criteria for a particular object can be modified, rules cannot be added to the system.

To translate a rule-based system of the prior art into the relevance-actions-value based system of the present invention, a description of relevant objects must be developed, which will not match one for one with the set of facts or objects in the rule based system, and then each of the rules must be examined to determine whether a portion of the rule should be reflected with an appropriate expression in the behavior criteria for one or more of the objects. With such a translation, some possible results of the original system would not be achievable.

Prior art systems devote processing to navigating a decision tree and reducing the system search space in order to make the system behave more the way we perceive human experts to work, and to achieve greater processing efficiency at run time. But the processing necessary to search rule conditions, navigate the tree, and reduce the search space, is work that the system must perform, and therefore consumes time and system resources. In this invention, a tradeoff is made by committing to examine all objects in the knowledge base in return for avoiding the navigational processing of conventional systems. Yet the same rich network of logic, knowledge, heuristics, and analytical dependencies are represented in the behavior criteria which determine the firing of objects. Performance considerations then focus on ensuring that objects are processed efficiently, particularly those objects that do not fire and are therefore bypassed.

The invention achieves numerous advantages over prior art expert system programming methods. Avoiding the problem of search strategies allows the system to run faster. The use of objects which have behavior criteria and which can be given a value for reference by other objects allows expert systems to be more easily programmed and debugged. The sequence the program will follow and the results that it will achieve are more predictable. The invention allows a consultation session to be easily restarted at any point. As discussed in the detailed description below, the invention allows validation tables to be constructed which allow for easy proof that the system has been correctly constructed.

Although the programming method was invented to meet the need for improved methods for building expert systems, it can be used for programming many other types of computer applications as well. It is particularly well suited to problems which involve multiple decision tree branches with interdependencies and where ease of building, debugging, and validating the system are relatively important compared to the processing speed of the resulting system.

BRIEF DESCRIPTION OF THE DRAWINGS

FIG. 7 shows the data structure of the control strings.

FIG. 12 shows a sample validation table as presented by the validation table generator component of the invention.

DETAILED DRSCRIPTION OF PREFERRED EMBODIMENT

Definition of terms

Application—An application is a set of one or more related expert-system modules that collectively form a conceptual whole and are designed to work together to represent the entire problem domain modeled by the expert system. A given application will have as its centerpiece a database file (the Object Data File 40) containing information about all objects used in the application, and information about each of the modules as well.

Module—A module is a subset of the defined objects of the application that forms a stand-alone expert system in its own right. Each module handles one conceptually distinct aspect or area of the expertise needed to be proficient in the overall application domain. In the preferred embodiment, modules are able to call other modules as subroutines in the course of their own processing.

Knowledge base 10—A knowledge base is the collection of data files in the invention that contains all of the data about the application. These files consist of the Object Data File 40, the Statement Data File 42, and the Expression Data File 44, together with their associated index files.

Object—Objects are the basic building blocks of a knowledge base. Each object represents a fact, question, conclusion, calculation, recommendation, or other material which can, under appropriate circumstances, be asserted as applicable in the reasoning process being modelled. If a piece of data needs to be captured during the course of a consultation, it will be represented by an object.

Attribute—Properties of objects are called attributes. According to the invention, the attributes of every object must include "relevance criteria" 1 and a specification of actions 2 to be taken if, upon evaluation, the relevance criteria are satisfied, one of which may be the setting of a value 3 for the object. In the preferred embodiment, every object also has a descriptive name, which is developer-supplied, and a unique identifying number (the "identifier"), which is system-supplied, as well as an object type designation and an attribute indicating that the object is a member of at least one module. Attributes for a particular object may vary from module to module, among the modules of which it is a member. For example, in one module an object may be an explicit question to be asked of the user, while in another module of the same application the same object might be an internal conclusion which concludes a value 3 based on the values 3 of other objects in the module.

Modules also have attributes, as does the application as a whole. These application-level attributes are stored in the Object Data File in application records, which have an object type of "A".

Figure 9:
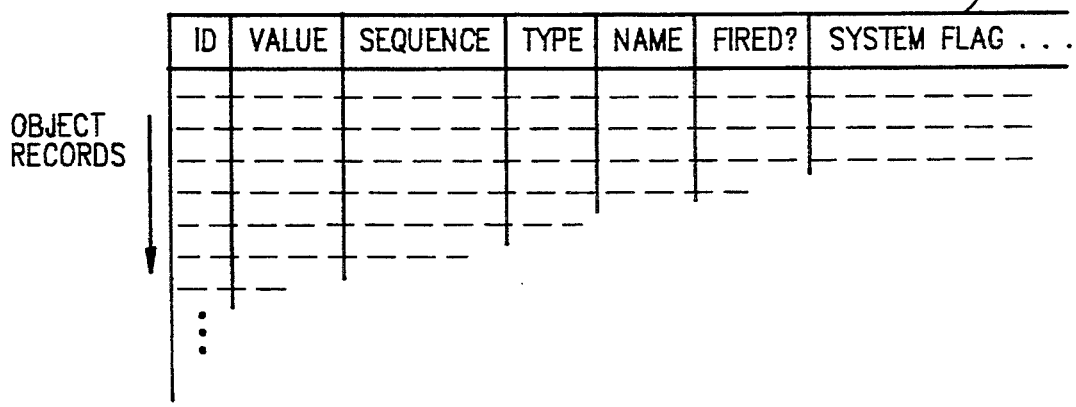
FIG. 9 shows the data structure of the object values file.
Figure 10:
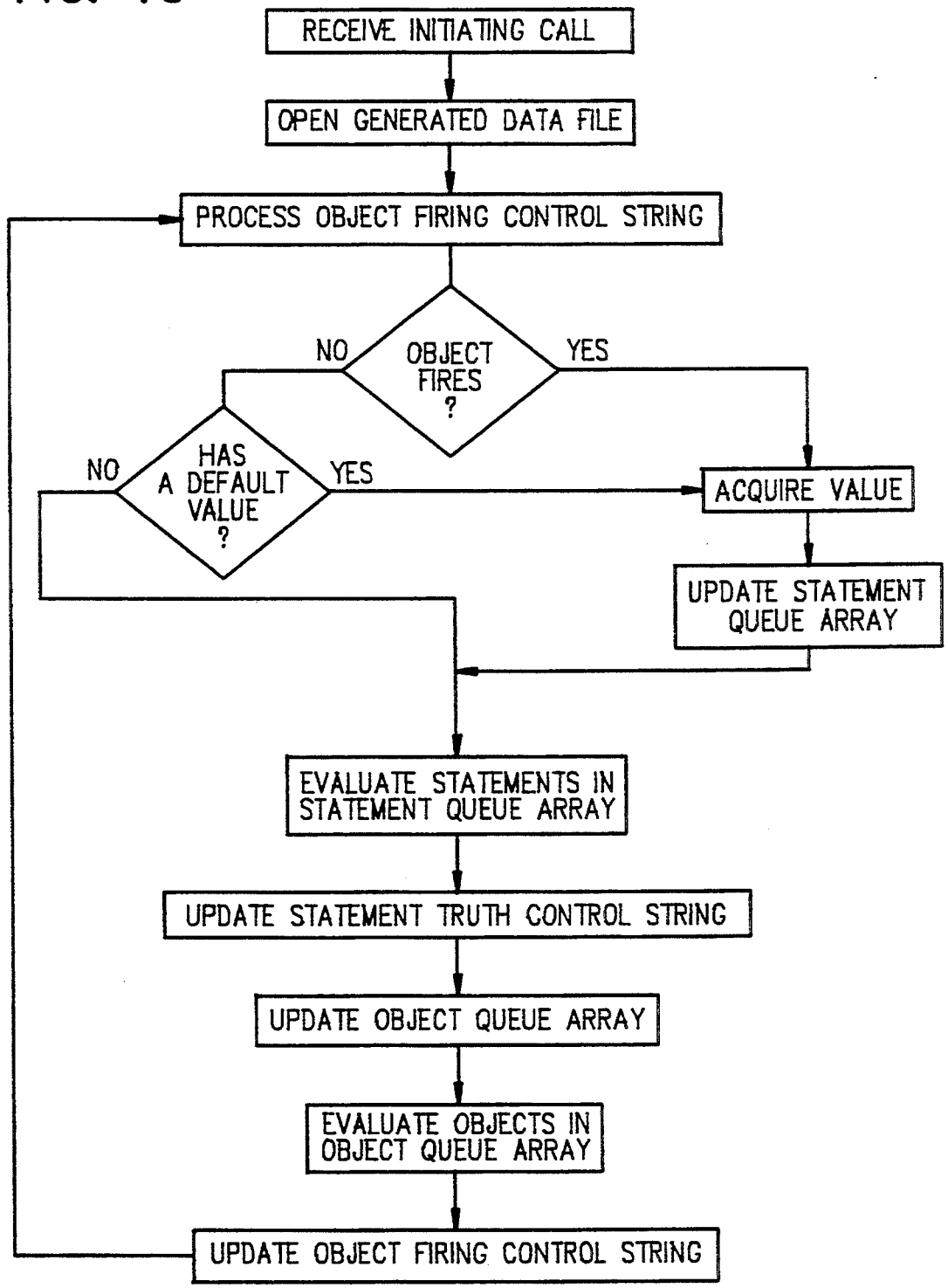
FIG. 10 shows an overview flow chart of the object processing program in the preferred embodiment.
Figure 11A:
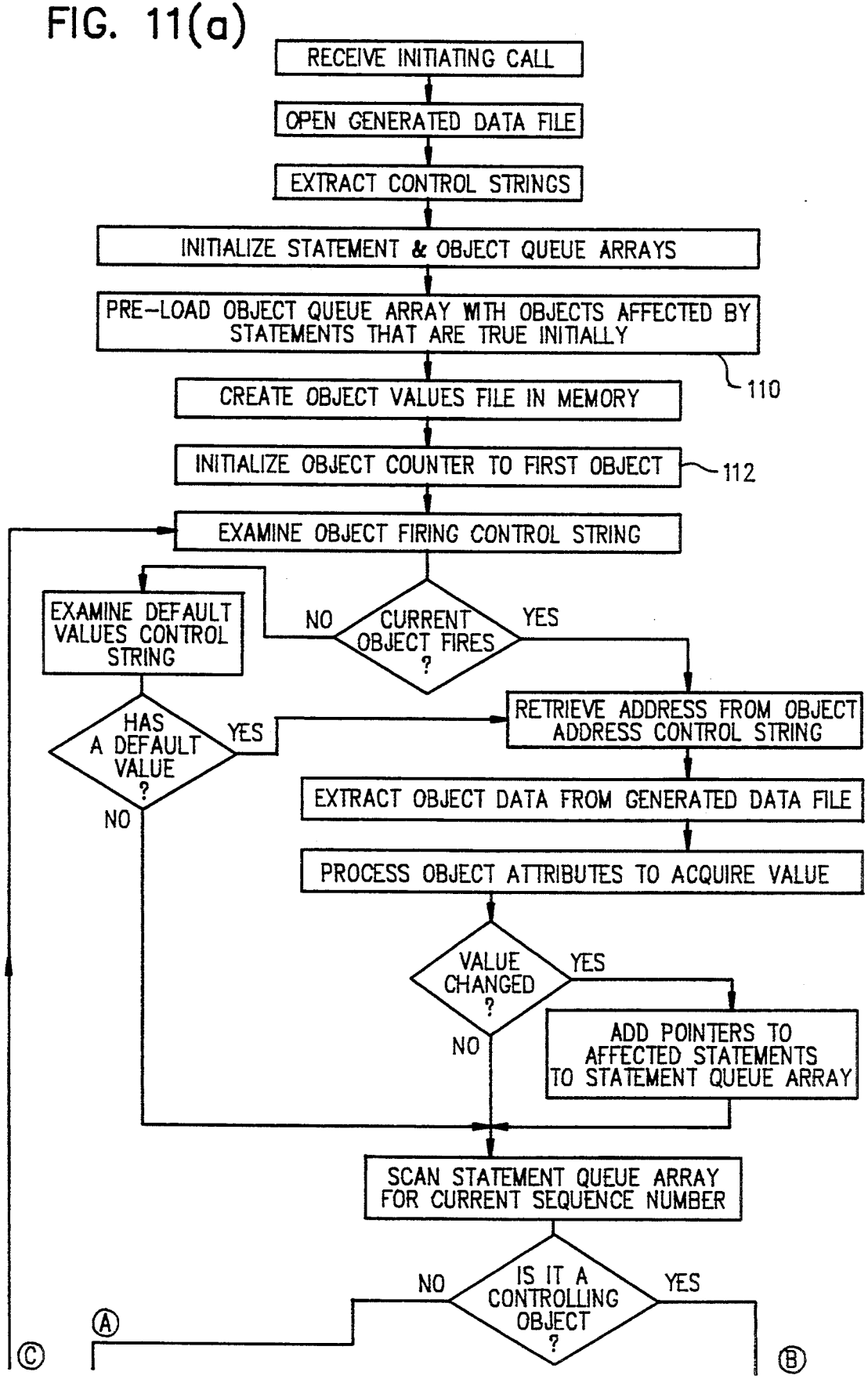
FIGS. 11a and 11b show a detailed flow chart of the object processing program in the preferred embodiment.
Figure 11B:
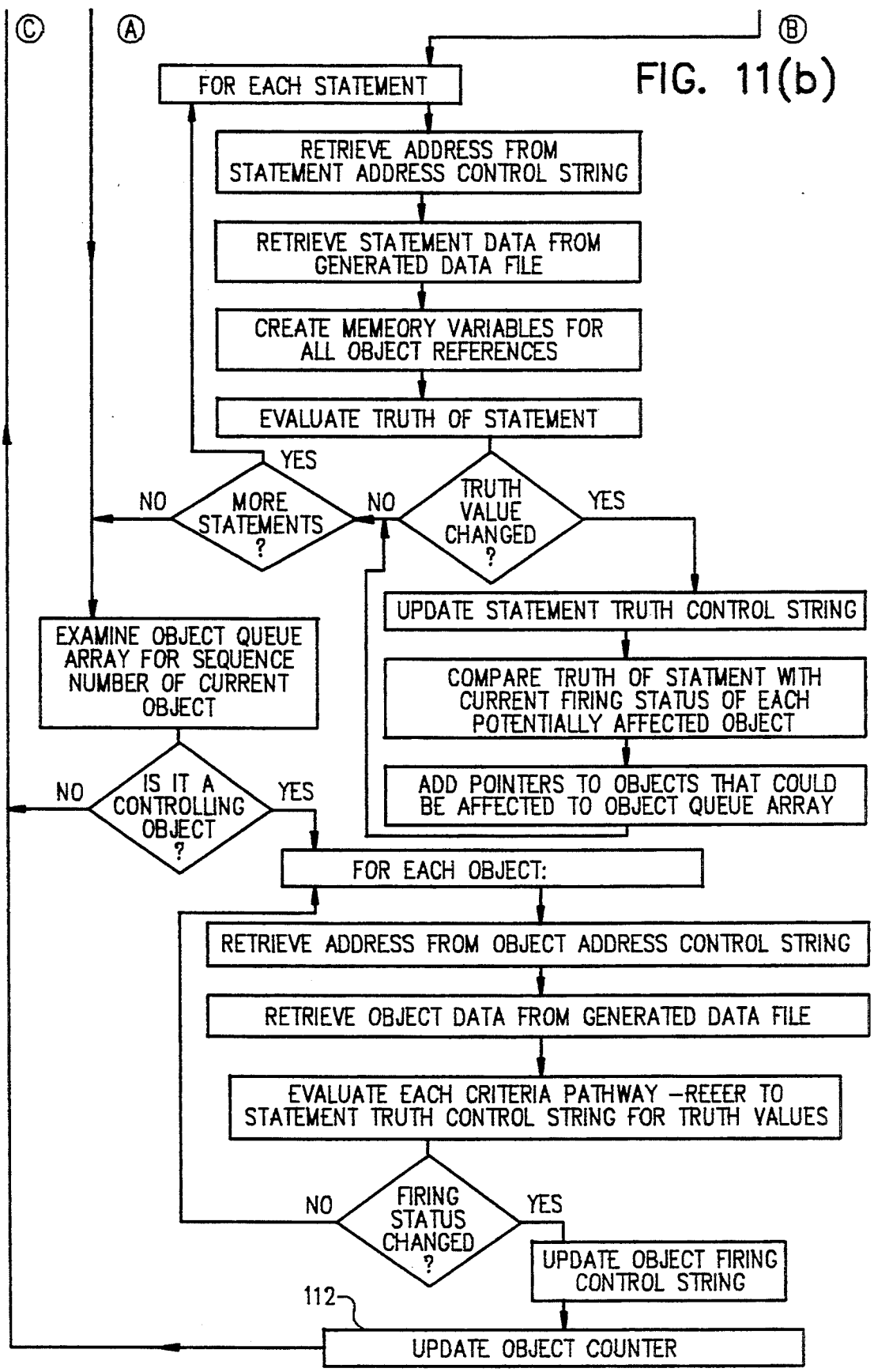

Object Value 3—Each object can be given a value which can then be referenced and used by other objects. Object values are stored in a file (see FIG. 9) created during a consultation.

Consultation 15—The process in which a user interacts with the developed expert system application is called a consultation. During a consultation, the system processes the objects entered into the knowledge base. Various objects ask for information from the user where necessary, and other objects draw conclusions based on the entered information. After all necessary data has been collected, the consultation typically continues by processing more objects and asserting conclusions or recommendations that are found to be applicable, based on the data collected.

Developer & User—The developer is the person (or group of persons) who creates the knowledge base in order to model the desired expertise. Usually this is the domain expert, the person who has the expertise being modeled. The resulting expert system application is distributed to multiple non-expert users, who benefit from the expertise by using the system.

Generated Data File 14—Having developed the knowledge base by creating all necessary objects and specifying all of their attributes, the developer generates the Generated Data File from the data in the knowledge base with the Generator Program 8. The Generated Data File is distributed to users together with the Object Processing Program 9, which uses it to run the analysis. The knowledge base itself remains with the developer and is not distributed. Modifications to the system are accomplished by altering the knowledge base, generating an updated Generated Data File, and distributing that new file to users.

Composition of an Application

The centerpiece of an application is the collection of files known as the knowledge base 10. The Generated Data File 14 is generated from these files, and the Object Processing Program 9 uses the Generated Data File in order to run the resulting system.

In the preferred embodiment, the invention is implemented in FoxPro, a microcomputer relational database management system. FoxPro is a variant of the "X-base" family of languages which originated with dbase. The fact that X-base is the de facto industry standard database language for micros means that the invention allows significant connectivity with other systems. This is enhanced by the invention's ability to call custom subroutines from within a consultation, to exchange data with standard external files, and to be called as a module from external programs, such as menu systems.

A consultation can be initiated from other programs by passing parameters which indicate the application number and module number for the consultation. For example, an overall menuing program might have a menu choice for each module in an application, other choices for modules of a different application, and still other choices for subroutines that are not consultations.

Several other types of files are usually needed in order to constitute the overall application in its final form. Typically there are other data files that are created by the developer to hold data for a historical record of prior analyses. These can be crucial to the correct performance of the system, since the invention allows values to be imported from such external files and assigned to objects in the course of processing a consultation. The invention also can take a consultation 15 (partial or complete) in its entirety, including answers supplied by the user, and save it in compressed form to a memo field in a particular record in such an external file. This allows consultations to be replayed at a later date.

In addition to external data tables, a finished application will usually include a file of custom subroutines which may be called by objects during the course of processing a consultation. The invention can open a channel to such a file in order to allow rapid access to such subroutines by opening it as a FoxPro procedure file at the start of the consultation 15.

Contents of the Knowledge Base

The knowledge base 10 consists of the objects within an application and their attribute data. The knowledge base holds all information about the objects, their characteristics, their interrelationships, the external files they interact with, and the customized subroutines that they may execute.

The knowledge base is contained primarily in the Object Data File 40. Each record in this file holds an object. Each object must have a name, one that should be intuitive to the developer. It will also have a system-generated, unique identification number (the "identifier") used by the invention. It will also have various attributes that distinguish it from other objects. One fundamentally important attribute of each object is its "relevance criteria" 1: the circumstances under which the object is considered to be relevant to the analysis. (An object that is determined to be relevant is said to "fire".) Other attributes include actions that an object may take, and action criteria which describe the conditions under which the actions should be executed.

Other files support the Object Data File 40 to form collectively the entire knowledge base. These are:
- the Statement Data File 42, which holds unique statements used in relevance and action criteria, and
- the Expression Data File 44, which contains all unique values that objects may acquire, as specified in the Object Data File, and unique left-side and right-side expressions used in criteria statements.

Figure 1:
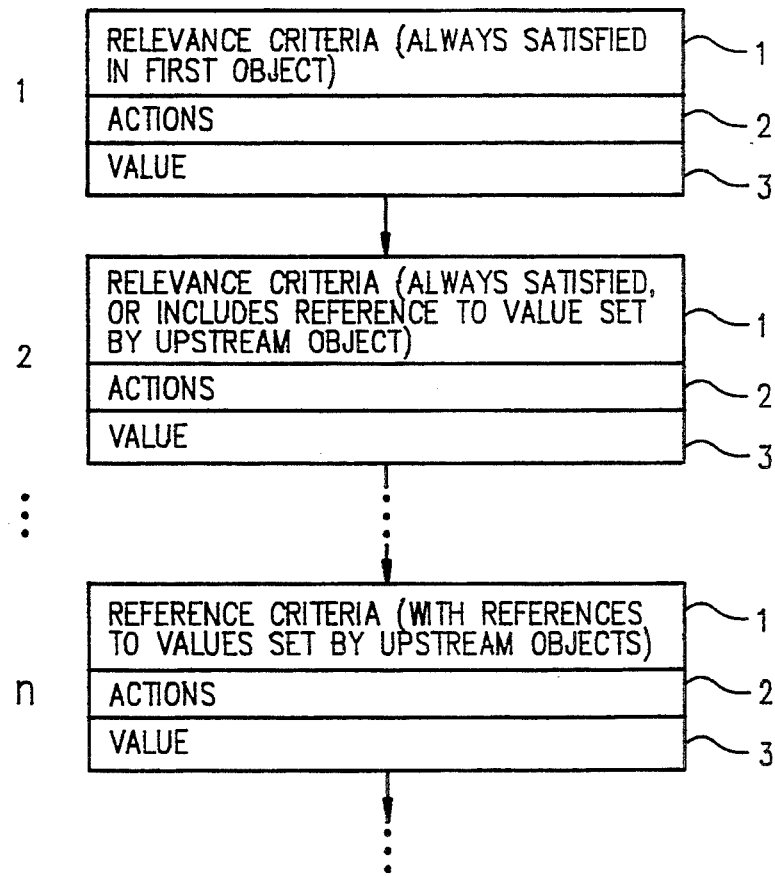
FIG. 1 shows a sequence of objects containing the essential elements of objects in the invention.
Figure 2:
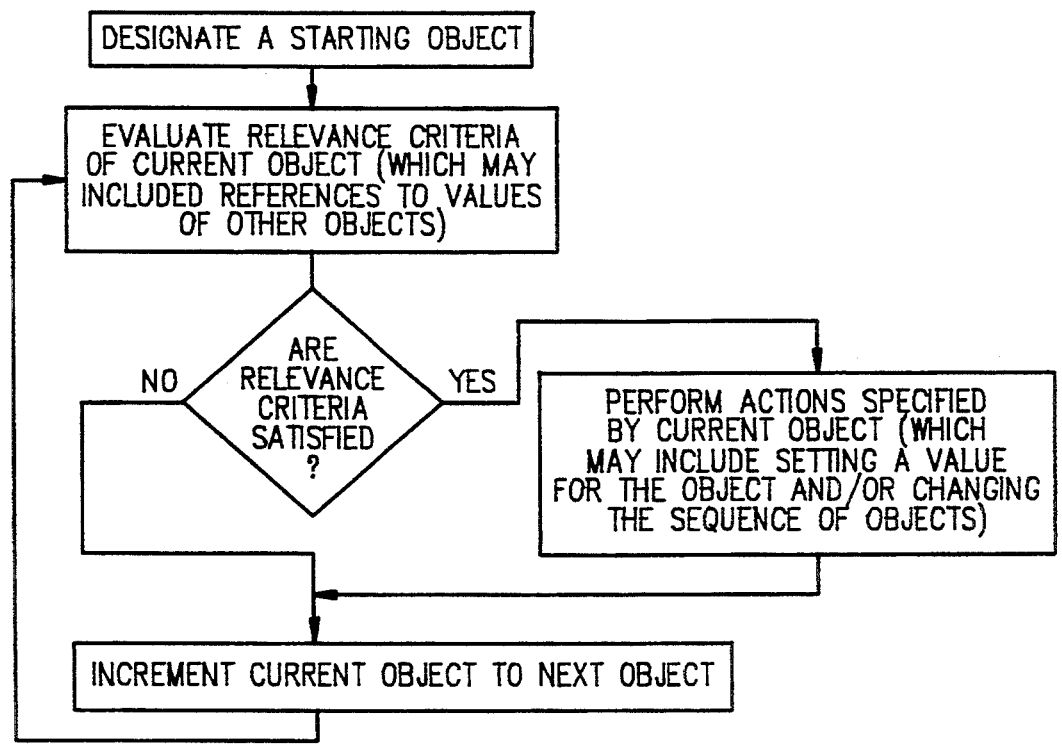
FIG. 2 shows a simple form of object processing program which may be used with a data set comprised of objects according to this invention.
Figure 3:
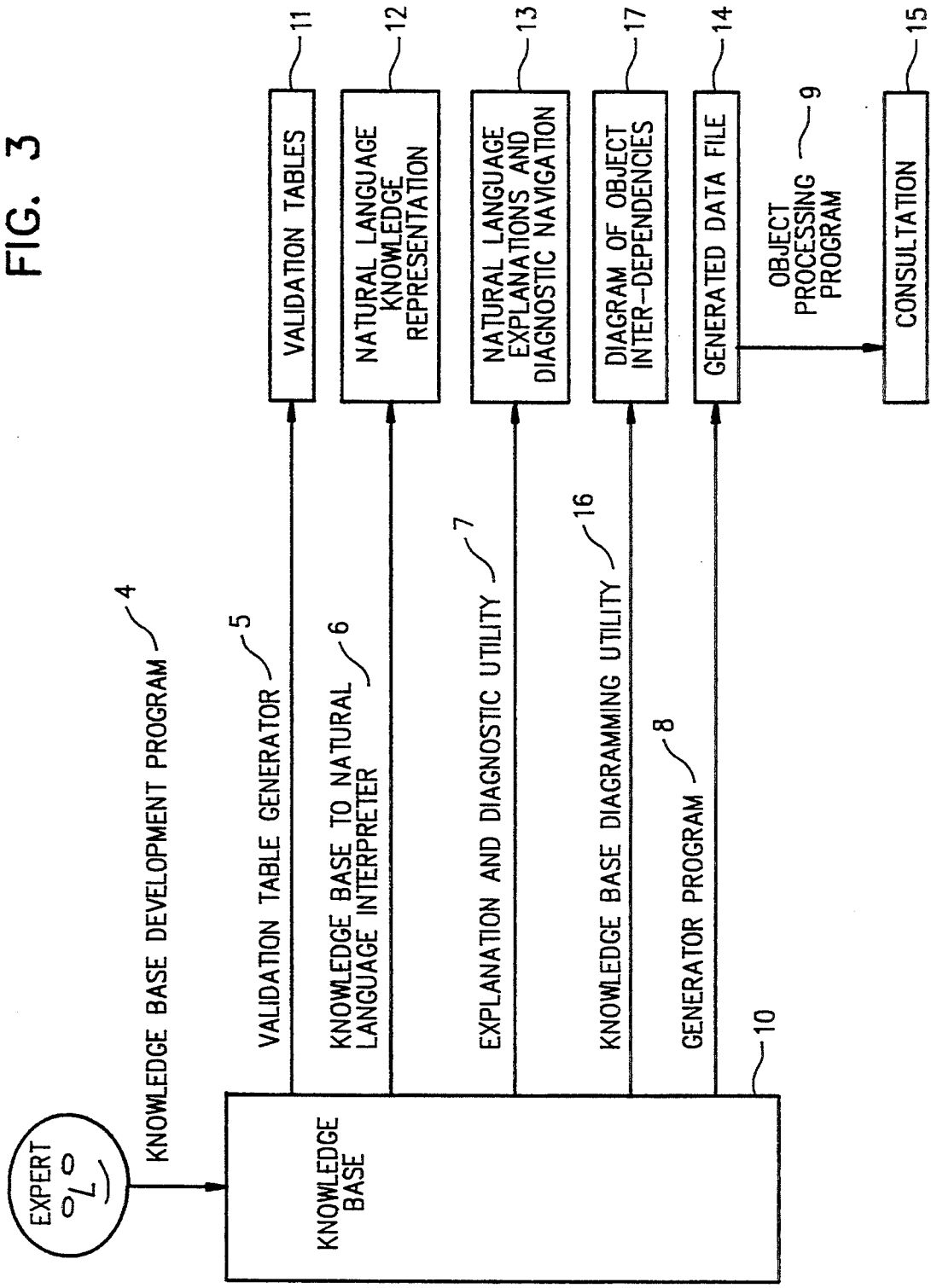
FIG. 3 shows the various computer programs, along with their inputs and outputs, which make up this invention.
Figure 4:
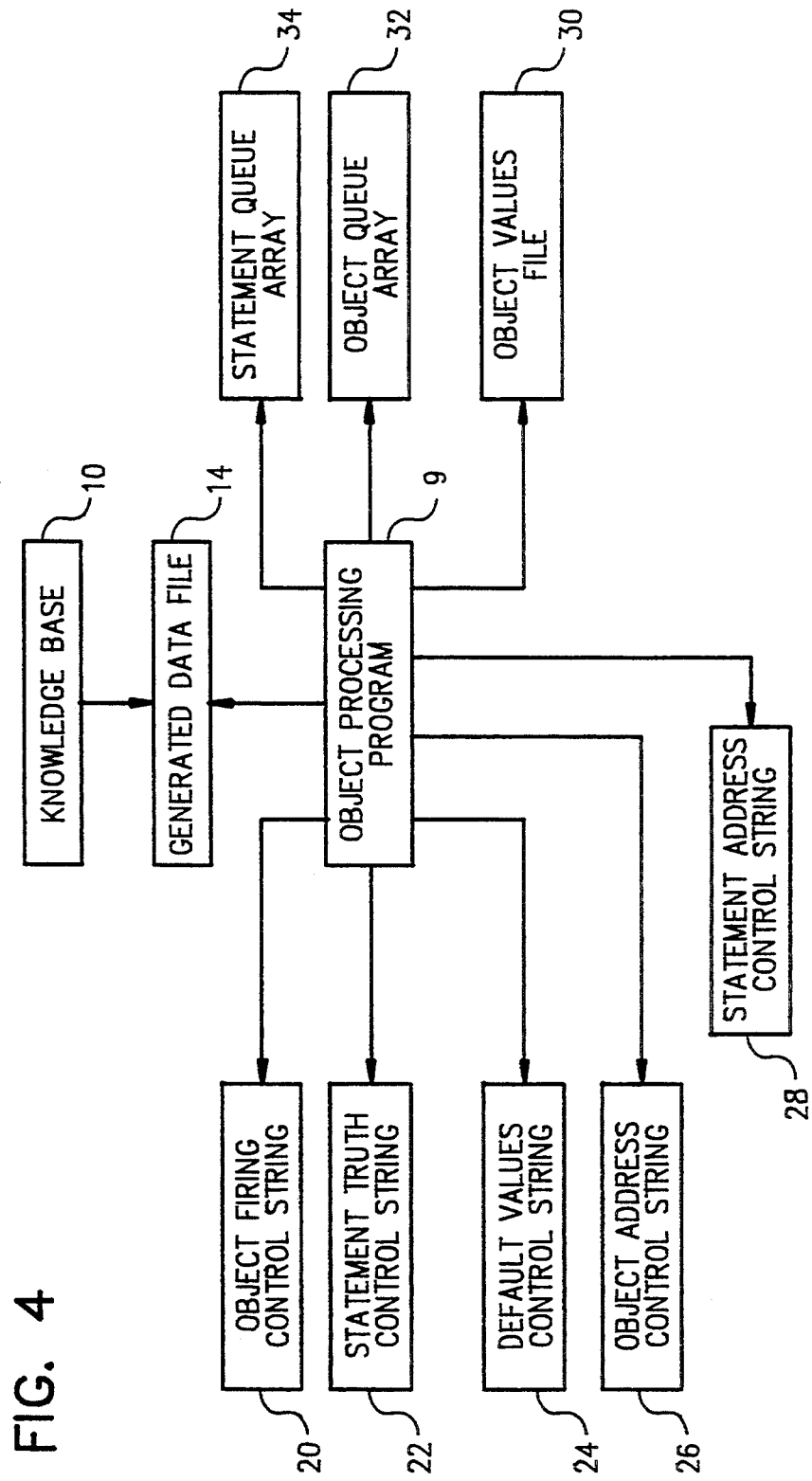
FIG. 4 shows the various computer files which the object processing program of the invention uses to perform a consultation.
Figure 5:
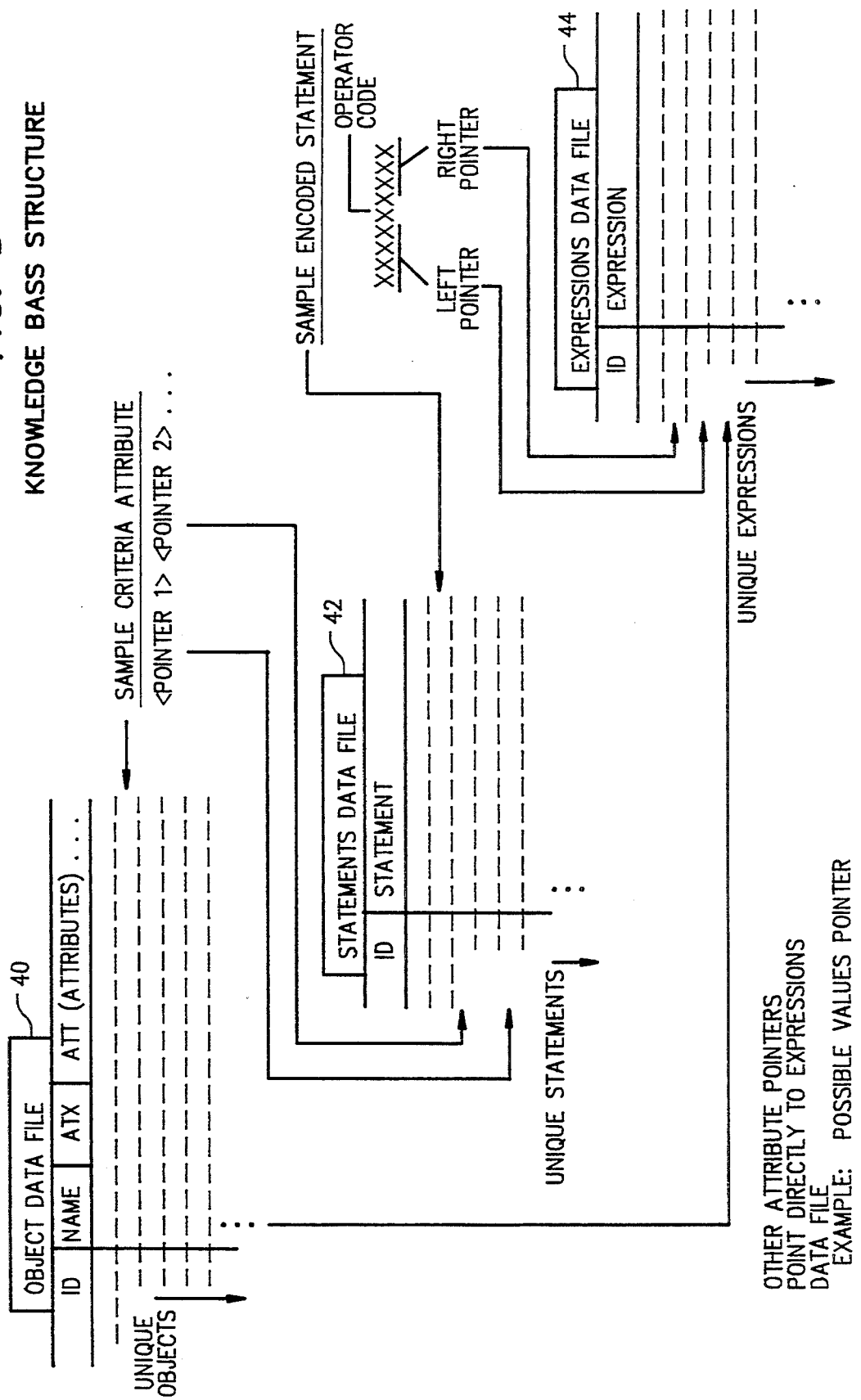
FIG. 5 shows the file structure of the knowledge base.

As shown in FIG. 5, the Object Data File 40 has the following structure:

| Field | Type | Length |
|---|---|---|
| ID | Character | 4 |
| NAME | Character | 10 |
| ATX | Character | 20 |
| ATT | Memo | 10 (a pointer to variable-length text in an associated file) |

The ID field stores unique numeric object identifiers. The Statement Data File and the Expression Data File contain similar identifiers. New identifiers are assigned as needed by finding the largest identifier in current use and incrementing its value by one. To facilitate the use of such identifiers as pointers, all identifiers are stored as character strings composed of numeric digits, e.g. "0123" or "6397". The preferred embodiment uses 4-character strings, yielding a system capacity of up to 10,000 identifiers in each file ("0000" through "9999"), but identifier strings of any length may be used.

The NAME field stores each object's name. Every object in the knowledge base must have a unique name, assigned by the developer upon its creation. A name should be descriptive of the meaning of the object, or the role it plays in the analysis being modeled, but is limited to FoxPro's maximum length of 10 letters for memory variables, so that such variables may be created using these names if desired. An implementation of the invention using a language other than FoxPro would likely have a different constraint on the allowed length of a memory variable name.

The ATX field stores temporary attribute codes extracted from the ATT field. These codes are used for indexing, to facilitate the handling of objects and the editing of their attributes. When a module is opened so that objects in the module may be edited, certain attribute codes are extracted from the ATT data for the module and stored in the ATX field, updating the index files. For example, one of the attributes stored in ATX is the object type code: this allows all objects of a given type to be grouped together and viewed as a single collection of objects.

The ATT memo field stores all attribute data (other than ID and NAME), in the form of character strings. Where an object is a member of more than one module, module delimiters (described below) separate one module's data from the next module's data. Within an attribute data string, attribute delimiters separate one attribute's data from the next.

System Organization

The developer of an expert system application using this invention creates objects and organizes them into a desired sequence. The sequence usually flows from the approach used by the expert when solving a problem, and the resulting sequence will reflect the progression of the expert's thinking when analyzing the problem. This close mapping between the flow of logic in the system and the natural approach taken by the expert is of great practical benefit in system design and testing, making it possible for the expert to model his or her own expertise directly in the system.

Object sequence is also important from the user's point of view. Questions asked of the user, and messages from the system to the user, will vary from consultation to consultation, as different objects are determined to be relevant under different fact patterns. It is beneficial to present the questions and messages to users in as consistent an order as possible, so that over time the user will find the behavior of the system familiar and internally consistent. This can be a factor in the confidence users place in the system, and in its ultimate acceptance.

When the Generated Data File 14 is created from the knowledge base 10 by the Generator Program 8, the invention will resequence objects if necessary in order to ensure that object dependency relationships are respected, but such resequencing is kept to a minimum in order to preserve the developer-defined object sequence to the extent possible.

Knowledge Base Delimiters

Several delimiter conventions are used in the invention to separate attribute data within an object and to identify module information.

Module delimiter—this identifies data for a particular module. It takes the form of a tilde ("≈"), followed by a twodigit module number. For example, data for module 7 would appear in this way ≈07<data>.

Attribute delimiter—this marks the beginning of an attribute data string. It consists of ASCII character 4 (" "), followed by a two-digit numeric code identifying the attribute. For example, the text of an on screen object is assigned attribute number 5. It's attribute delimiter is: 05<text data>.

Internal data delimiters—The invention uses several characters as delimiters to separate data elements within attribute data strings. These include the vertical bar ("|"), and backslash ("\").

Criteria delimiter—where criteria are coupled with a particular data element (for example, when one of several possible values for an internal conclusion has associated action criteria), ASCII character 254 ("▇") separates the data element from the criteria string.

Objects and Their Attributes

An object represents any individual element of the analysis being modeled in the expert system.

An object could be, but is not limited to, any of the following:
(1) any useful concept, idea, abstraction, or judgement,
(2) any fact that the human expert in the problem domain might need to know in order to solve the problem, (3) a representation of a real-world entity, such as a person, a machine, or an organization, (4) any question to be asked and answered by the user, (5) any conclusion to be drawn if specified facts are present, including intermediate conclusions and the results of calculations, or (6) any answer, recommendation, message, or other result that might be produced as useful output in the course of the analysis.

Each object has a collection of assigned attributes which, in a typical system might include:

(1) ID: A unique identifying number.

(2) NAME: A unique name, which is an intuitive descriptor defined by the developer to connote the object's meaning.

(3) TRANSLATION: A meaningful, short, but usually multi-word description of the object, which is displayed during execution in various contexts as a replacement for the more cryptic object name.

(4) OBJECT TYPE: An object's type is a mandatory attribute of every object which determines the standard actions that are performed in order to process it appropriately when it fires. The Object Processing Program will recognize the object type attribute for a firing object and will call the necessary subroutines in order to process it appropriately. Objects that are common to multiple modules in an application can be of different types in the different modules. Within a module, an object may be assigned multiple types (for example, a message object may also be designated an output object, so that the message text is output to a file after processing).

(5) SEQUENCE: The initially preferred sequence for evaluation of each of the objects within the consultation is specified by the developer. Developer sequences are respected where possible, to allow maximum control over the order in which onscreen objects are presented to the user. However, if an inconsistency is discovered between a developer-defined sequence and an object dependency relationship when the Generated Data File is being generated, objects will be resequenced by the Generator Program 8 as required in order to satisfy the object dependency relationships involved, i.e., ensuring that all objects on which a given object depends precede it in the resulting sequence.

(6) TEXT: The text of a question or recommendation or message that is concluded to be applicable if and when the object fires.

(7) POSSIBLE VALUES: Possible menu choices that might be presented to the user when a question is asked on screen, or alternative values that might be concluded by an object, including constants, literal strings, mathematical formulas to be evaluated, default values, or references to other object values.

(8) DATA TYPE: The data type of the object's expected value to be concluded.

(9) LINKS: Instructions for interactions between the object and other entities, such as importing a value from an external data file, exporting data to such a file, or calling a subroutine.

(10) RELEVANCE CRITERIA: A set of statements to be examined when the object is evaluated. If, upon evaluation, the relevance criteria are satisfied, the object will "fire" at the appropriate time in the sequence by taking the actions of performing the appropriate action for the object type, setting a value for the object, and performing any specified links.

(11) ACTION CRITERIA: A set of statements to be examined after an object has fired in order to determine if possible actions are to be performed. If, upon evaluation, the action criteria are satisfied, then the action will be performed. Not all actions have action criteria; where they do not, such actions are always performed.

Types of Objects

There are no hierarchies or other classifications of objects for purposes of knowledge representation. In particular, realworld knowledge is not explicitly represented through object classes, as is the case in prior art "frame-based" or "object-based" expert system development tools. The objects in the knowledge base are separate, atomic units on a peer level with one another, and do not inherit attributes from one another.

Every object in the knowledge base will have as an attribute at least one assigned object type designation. The possible types of objects are:

system object: go-to
system object: reset
system object: inter-module call
demon object (calls a subroutine if it fires)
input object: screen—user input
input object: screen—select one from predefined menu
input object: screen—multi-object list
input object: screen—message object
input object: conclusion—import
input object: conclusion—conclude a value
output object—list ID to file
output object—list text attribute to file
output object—export object value to file An object can be designated as being of more than one type. For example, a message object is designated as a screen object type and will appear on screen as an input object during the consultation, and it may also be designated as an output object, so that its text is used for some purpose at the end of the consultation.

Input Objects

The class of input objects is divided into two subclasses, screen objects and internal conclusion objects. Screen objects ask questions to elicit information from a user of the system, and may require direct data entry or a selection from a menu of alternatives. They may also post messages on screen, to advise the user and make recommendations. Internal conclusion objects acquire values according to predefined settings for the Possible Values attribute, which may refer to the values of other objects, or by importing values from external sources, such as a database file.

Screen objects

These are objects which acquire a value supplied by the user. Text appears on screen, and the user supplies an answer. The text of a screen object can contain embedded values, including live data from the current consultation. There are four types of Screen objects: user-input, select-one, messages, and multi-object lists.

(1) User-input screen objects

These objects require the user to type in an answer. For example, if the consultation requires a figure for the dollar value of a contract, the knowledge base should have an object that asks the user something like "What is the value of the contract? " in order to acquire this value. The text of the question to be displayed on screen is stored as the text attribute of the object. Another stored attribute specifies the number of spaces or columns on screen that the system should provide for the user to type in the answer to the question.

(2) Select-one screen objects

These are objects which ask the user to select one answer from a pop up menu of possible choices. The text of the question is displayed and the menu of choices appears, allowing the user to make a selection. Unique menu alternatives are stored in the Expression Data File 44, and pointers to such values are stored in the Object Data File as the Possible Values attribute of the object. In this way, menu alternatives are only stored once, and may be reused by other objects by using pointers to the alternatives.

Menu choices can be suppressed from appearing on a menu by assigning action criteria to the menu choice. At runtime, these criteria will be evaluated when building the menu, and if the criteria are not satisfied, the choice will not appear. This allows menus to behave in a context-sensitive manner, responding to the particular facts of a consultation, so that irrelevant choices are not offered to the user. Where no action criteria are specified for a menu choice, the choice always appears on the resulting menu.

(3) Message screen objects

These objects are displayed on screen, but they are not questions and do not accept any response from the user other than pressing a key to continue. Message objects are used to display information to the user or to post notices that call the user's attention to some fact or result. The information displayed could be advice, recommendations for actions, or the interim results of a particular analysis that has been performed by the system. Frequently, a message object will have the current values of one or more other objects embedded in its text.

Message objects are quite useful for communicating the progress and the results of the system's analysis as it proceeds during the consultation. Additionally, they are useful aids for developers when debugging the knowledge base. Often, message objects are also designated as output objects, so that their text is asserted as applicable in some fashion at the end of the consultation, e.g. in a report containing consultation results. If they are so designated, their formatted text (including any embedded values) is preserved to become the object's text as an output object.

Message objects do not acquire values per se, but are assigned a value of "<System Message>" by the system. This allows them to be viewed and recognized as messages when the user is reviewing the values of objects that have been processed, and allows their values to be referenced by other objects if desired.

(4) Multi-object lists

A multi-object list presents the user with a list of items, each of which represents an object within the system, and allows a "mark all that apply" approach, instead of requiring a single choice from a menu. In a multi-object list, each item presented on the list of choices is an object in its own right. Each object has its own relevance criteria which determines its applicability. If these criteria are satisfied, the object will appear on the resulting list; if not, the object will not appear.

Objects to be included in a multi-object list have as an attribute the number of the particular multi-object list to which they belong. During the consultation, such objects are processed in the order encountered to determine their applicability, and a list of the successful objects is maintained in memory. The final object in a multi-object list has an attribute which indicates that it is the last object. After processing this terminating object, the resulting list of applicable objects is presented to the user.

Internal conclusion objects

Internal conclusion objects acquire values just as screen objects do, but they do it transparently, without the involvement of the user, based on previously entered information. Conclusions can have one or more possible values to conclude or calculations to perform, as specified by the Possible Values attribute, and may use the values of other objects in the application. Conclusion objects may adopt the value of another object, perform a calculation using other objects' values, accept a literal string as a value (for example, "YES" or "Sell the stock"), call a custom subroutine to assign a value, or import a value from an external file.

An internal conclusion object may contain an expression to be evaluated, and the result of such expression becomes the value concluded by the internal conclusion object. Unique possible values or expressions are stored as records in the Expression Data File 44, and pointers to these records are stored as the Possible Values attribute of the internal conclusion object. Potential values to be concluded may have specified action criteria, which are evaluated in the order that the values are defined. The first successful value is taken as the value of the object, and the remaining values or expressions in the list of possibilities are not considered. This allows possible values to be prioritized. Where a potential value has no action criteria specified for it, the value is always concluded.

Internal conclusion objects may alternatively import data from another source, instead of using predefined values. Instructions for performing the import are assigned as an attribute of the object. These instructions include the name of the data file to be used, an associated index file name, an expression to be evaluated to serve as an index key for locating the desired record in the external file, and an expression to be evaluated to acquire the value to be imported (usually comprised of one or more fields in the external data file). Imports may have action criteria defined for them. At the time the import is to be performed, such action criteria are evaluated and the import is performed only if such criteria are satisfied.

Output objects

Output objects are a powerful way for the system to report answers or conclusions drawn during the consultation. The knowledge base can be configured to evaluate the applicability of various possible alternative statements or recommendations, based on entered facts, and assert them in some fashion at the end of the consultation.

System objects

System objects achieve basic system operations for program control in special situations. If the consultation should be terminated and started over, a "reset" system object can cause the values of all objects to be released, and the system to be started again in its initial state. System objects can cause other modules to be run, with control then returning to the calling consultation, and can cause the consultation to jump to a specified object under given conditions.

Application Level Attributes

Every Object Data File 40 contains an application record in addition to object records. The application record contains control information and attributes about the application as a whole, and attributes for each module, as distinguished from object level attributes. For example, the name given by the developer to Module 6 is a module level attribute. It is the text string that the system will extract and place in the upper left corner of the screen when executing the consultation for Module 6.

The application record is distinguished from regular objects with an "A" in the OBJECT TYPE attribute. The NAME attribute for the application record contains a numeral (for example, "1"), which is the application number.

The application record stores:
  the title of the application as a whole,
  a version number for the entire knowledge base,
  the names of application-specific external files which should be opened at the outset of a consultation and left open to facilitate the exchange of data between the system and such external files,
  the name of a default global help file for the application, and
  module-specific attributes Module-specific attributes in the application record are:
  the module number,
  the title of the individual module,
  a version number for the module,
  the date and time of the most recent generation of the module's Generated Data File 14,
  the name of a procedure file to be opened, to allow access to custom subroutines to be used by the module,
  the name of a module-specific help file,
  instructions used when looking for restorable consultations, and when saving consultations, (These instructions include the name of an external file where consultations are stored, expressions used in order to construct a menu from which to select a particular consultation to be restored, and an expression used in order to construct an index key to be used at the end of the consultation to locate the appropriate record for consultation storage.) and
  instructions for constructing and refreshing a status display which is shown in the upper right corner of the screen during a consultation.

Relevance Criteria

Knowledge is represented in the system by the meanings of the objects that are created, and additionally through the use of a fundamental attribute of every object: its defined collection of "relevance criteria", which consists of one or more declarative statements. Statements take the form of a left-side expression of any complexity, a conventional operator, and a right-side expression of any complexity, and can be evaluated for their truth value. These relevance criteria statements may refer to the values of other objects in the system, thereby creating inter-object dependency relationships.

Multiple statements in the relevance criteria set for an object are linked by the Boolean operators "AND" and "OR". Statements may be grouped algebraically in an arbitrarily complex fashion, with nested parenthetical groupings allowed, and may be assigned a required certainty factor which must be satisfied in order for the statement to evaluate to "true" (see "Certainty Factors" below). The resulting set of statements in the relevance criteria collectively form a complete description of the circumstances under which an object should be considered relevant and applicable to the analysis which the expert system is designed to perform.

For example, if X is an object, a typical statement in its set of relevance criteria might be: "A>B". This creates a dependency relationship between X and the objects A and B, for X's applicability in the system will be influenced by the values of A and B. The statement can be evaluated for truth, using the values of A and B and applying the ">" operator to compare them.

The groupings of statements, possibly nested, and alternatives among them (signified by a linking "OR" Boolean operator) are expanded by the Generator Program 8 during the creation of the Generated Data File 14 in order to form distinct, alternative, enabling "pathways" for the success of the criteria. All statements within such a pathway are connected by "AND", so that all statements must evaluate to "true" in order for the pathway's requirements to be satisfied. Any one such pathway for an object—when all of its statements evaluate to "true"—is sufficient to designate the object as relevant and applicable. If, upon evaluation, at least one of an object's enabling pathways does succeed and the object is therefore considered to be applicable, it is said to "fire". When an object fires, the consequence is simply that the Object Processing Program 9 ought to take appropriate action with it. What the object does when it fires is determined by its other defined attributes.

Certain objects in an application may always fire. For example, some initial data must always be collected in order to begin the analysis. Such objects are treated as special cases and are not assigned any relevance criteria. The absence of relevance criteria in this context is an indication to the Object Processing Program that the object should always fire.

The concept of relevance criteria is extended in the system beyond its fundamental application of describing the circumstances under which an object should fire, to describing the circumstances under which particular attributes of objects should operate in alternative ways. Such criteria sets are called "action criteria". For example, in the case of an internal conclusion object having some number of alternative values, each value will typically have, as an attribute of the object, a cluster of action criteria that specify the requirements for that value to be used. The action criteria statements for a given value are expanded if necessary to identify alternative, stand-alone pathways, any one of which is sufficient to cause the value to be assigned (concluded), and in each case the action criteria statements form a set of instructions for making the binary decision of whether to utilize the value or ignore it. By convention, the first successful value in a list of alternative values will be employed, and the remaining members of the list will not be evaluated. This allows the developer to prioritize the conclusion alternatives by organizing them in a preferred sequence.

In the case of a screen object with alternative menu choices, action criteria (if any) associated with a particular menu choice must be satisfied in order for that option to appear on the resulting menu, else it will be omitted. By convention, in this context all members of the list of values are processed, and values having no associated action criteria always appear in the resulting menu.

Internal conclusion objects may also acquire values by importing data from external sources, such as a database file. Action criteria may be specified to describe the circumstances under which such an import is to be attempted.

Other examples of extended uses of the criteria concept include describing the circumstances under which:

(1) a specified procedure or subroutine should be executed (2) one of several alternative phrasings of text should be employed (3) a value from one or more other objects should be dynamically embedded in the text of a given object to form a customized message.

Processing all objects and firing them on the basis of an evaluation of their relevance criteria produces a subset of the total objects in the knowledge base, a list of objects which are all known to be applicable (they successfully fired). This list can be thought of as a collection of objects in the knowledge base which is customized to fit the current fact pattern. The input objects in this set of successful objects have acquired all relevant information and have reached appropriate conclusions. All output objects in the set specify output actions that have been taken, such as asserting their text as answers and recommendations, and many others.

Output objects are usually blocks of text (of any length), and many expert systems are designed specifically to produce such text. The text could be something like "Check to see that the unit is plugged in.", or it might say something more significant, such as "Fire the missile and start the war." These are essentially just the communication of a result to the user of the system. "User" in this sense might be another system, rather than a human, and so the output object may indeed cause an action, e.g. causing some block of code to be executed, such as a subroutine, or an instruction to return a value to a calling program.

Alternatively, actual work product might be the goal: e.g., an "intelligent document assembly" program might produce an actual document, such as an insurance policy customized to the facts, risks etc. involved in a particular person's application for insurance. It might perform the analysis according to decision rules and company policies which are represented through objects' relevance criteria, and build the document using standard company language, embedding data values at specified places in the text. In such a case, what may happen is that the system should simply use the text of the successful objects to create the resulting file directly. Alternatively, the objects may just consist of pointers to files or blocks of text in other systems, and this system may just list the identifiers of the successful objects to a file. A follow-on program might pick up the resulting file and look to other resources to build the end product.

All objects on the list are considered, and based on their relevance criteria, some objects are listed as applicable under the known facts while others are rejected as inapplicable.

Often a knowledge base will include several objects to represent alternative outcomes for a given concept or result. For example, in an application for medical diagnosis one object's text might say "The available evidence indicates that this patient has Parkinson's disease." The following object's text might say "The available evidence indicates that this patient probably does not have Parkinson's disease." Clearly, these two objects should not both fire, and would have mutually exclusive relevance criteria. In the context of a particular set of facts, if one of these objects fires and is therefore asserted as applicable, its counterpart should not fire. Depending on the relevance criteria specified, it might also turn out that neither object will fire, perhaps because a previous object has ruled out the possibility of Parkinson's disease altogether.

The "Table View" of Criteria

Criteria statements are specified by the developer of a knowledge base using what is called a "table view". In this representation, each statement occupies a row in a matrix. There are columns for the Boolean operator, left-side parentheses for algebraic grouping, a left-side expression, a connecting operator, a right-side expression, right-side parentheses, and a certainty factor threshold for the statement. Left-side and right-side expressions in a statement may consist of any syntactically valid expression in the language being utilized, and often contain references to other objects. An object reference is specified by the developer by using the object's name, and enclosing the name in curly brackets ("{}").

All criteria statements (except the first) must be linked to preceding statements by a logical operator, either "AND" or "OR". Parentheses are used for algebraic grouping of statements, and may be nested up to five levels deep. Parentheses are also allowed within the expressions used in a statement, to permit normal algebraic grouping within such expressions. Certainty factor thresholds for individual statements are optional. Where omitted, the statement is treated as having a 100% certainty factor (see "Certainty Factors" below).

There are eight allowed connecting operators in statements, and each is assigned a number, as follows:

| Number | Operator | Meaning |
|---|---|---|
| 1 | = | equals |
| 2 | # | does not equal |
| 3 | > | is greater than |
| 4 | < | is less than |
| 5 | >= | is greater than or equal to |
| 6 | <= | is less than or equal to |
| 7 | $ | is contained within string |
| 8 | !$ | is not contained within string |

The last two operators work with comparisons of character strings. The "$" operator evaluates whether the left-side expression, comprised of a character string, is contained within the right-side expression, which is also a character string. Thus, the statement "bcd" $ "abcde"

evaluates to "true", and the expression

"xyz" !$ "abcde"

also evaluates to "true".

Here is a generic example of a complex set of relevance criteria for an object:

| Logical Operator | Left Paren | Left Expression | Connecting Operator | Right Express. | Right Paren |
|---|---|---|---|---|---|
| a) | | {OBJECT1} | = | {OBJECT2} | |

-continued

| | Logical Operator | Left Paren | Left Expression | Connecting Operator | Right Express. | Right Paren |
|---|---|---|---|---|---|---|
| b) | AND | ( | {OBJECT3}+{OBJECT4} | >= | 50000 | |
| c) | OR | | {OBJECT5} | # | ({OBJECT6}+{OBJECT7})/2 | |
| d) | AND | ( | {OBJECT8}/2 | < | 100000 | |
| e) | OR | | {OBJECT9} | > | 0 | |
| f) | AND | | {OBJECT10} | = | YES | )) |

The letters in the left column are labels designating the different criteria statements, to facilitate discussion.

When the Generated Data File 14 is generated by Generator Program 8, such criteria statement sets are evaluated and expanded to form standalone "pathways" for the independent ways that the criteria may be satisfied. In this expansion process, individual statements are treated as indivisible units, and are manipulated to create pathways by distributing common statements across parentheses groupings. The resulting pathways no longer contain "OR" terms, or left and right parentheses to group statements (although within a statement, any parentheses within an expression will remain unchanged).

In the example above, there are three possible ways that this object's criteria could succeed, causing the object to fire. Using line labels to represent the statements, the resulting pathways are:

| Pathway | Successful statements |
|---|---|
| 1 | a,b |
| 2 | a,c,d |
| 3 | a,c,e,f |

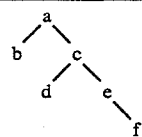

Firing Bias

The collection of relevance criteria statements for an object has an implicit result that incorporates default behavior for the binary choice of whether the object should fire. In the preferred implementation, this result is that if the criteria succeed, then the object should fire. As presented, the default is always not to fire the object, and the relevance criteria define the circumstances under which this default behavior should be overridden and the object caused to fire. This is referred to as the "firing bias" of the object: the system is biased against firing objects, and specified criteria must be satisfied in order to overcome this bias and affirmatively assert the applicability of the object.

Extensions of the criteria concept within the system—for example, use of action criteria to control which value should be concluded or whether an import should be attempted—use the same "affirmative" approach: action criteria specify the conditions under which something should happen, with the default being that the action should not be performed.

An alternative embodiment of the invention incorporates the opposite default behavior. In such a system, the firing bias is reversed, so that an object will always fire unless its relevance criteria statements are satisfied, in which case the object will not fire. Thus the relevance criteria become a description of when not to fire the object, rather than a description of when to fire it. In this embodiment of the invention, an application-level attribute specifies which firing bias to use, so that the Object Processing Program 9 behaves appropriately.

There is no inherent reason to prefer one firing bias over the other. In fact, overall system storage requirements are minimized if the two biases are both used and applied on an object by object basis, so that some objects have one firing bias while other objects have the opposite firing bias. In this alternative embodiment, an object-level attribute specifies the object's firing bias. If an object typically will fire in most cases, it may be more economical to represent the knowledge about its behavior by enumerating the circumstances under which it should not fire, i.e. by giving it a bias toward firing. Alternatively, if an object generally should fire only in specified circumstances, it may be easier to identify those circumstances and give it a bias against firing.

However, the mixture of two firing biases introduces significant maintenance problems in the system. Developers of a system find it much easier to deal with a consistent firing bias, and confusion can therefore be avoided by adopting a single firing bias and applying it consistently throughout the system.

Storage of Criteria

When specifying criteria for an object, the developer creates evaluatable statements. As shown in FIG. 5, unique statements that have been created are stored in a separate table (the Statement Data File 42), and are assigned a unique identifying number, using the same identifier scheme as was used in the Object Data File 40. Left-side and right-side expressions used within statements are stored in the Expression Data File 44, again with a unique identifier number.

Criteria sets are stored in the Object Data File. Statements used in criteria may be reused by different objects, and expressions used in statements may be reused by different statements. Consequently, statements are stored and referenced in the system separately from the objects which use them, and expressions are stored and referenced separately from the statements which use them.

The identifying numbers in each file serve as pointers among the three data files. Criteria sets in the Object Data File contain pointers to the applicable statements in the Statement Data File, using the statements' identifiers. A given expression is stored only once, in the Expression Data File. When it is used within a statement, the statement records the usage by using the expression's identifier as a pointer into the Expression Data File. Because a statement always consists of a left-side expression, an operator, and a right-side expression, an encoded representation of the statement as a 9-digit numeric string is possible:

<expression identifier> <operator number> <expression identifier>

EXAMPLE: "042530379"

In this example, "0425" is the identifier for the left-side expression. The expression itself may be retrieved by locating identifier "0425" in the Expression Data File and retrieving its stored expression, which might be something like "{OBJECT 63}+{OBJECT_09}". The "3" in the fifth position of the string stands for the third connecting operator, ">". Finally, the "0379" is the right-side expression's identifier, which when located in the Expression Data File might yield an expression such as "100,000". The complete statement therefore expands to become:

{OBJECT_63}+{OBJECT_09}>100,000

This is a statement which can be evaluated for truth, using values acquired during processing of the system. Such a statement can become one of an arbitrary number of statements in a given object's set of relevance criteria, and can be reused by other objects in their criteria sets as well. The 9-digit string representing this statement in encoded form is stored in the Statement Data File, and is assigned its own identifier, such as "2947". Because the expressions within a statement are referenced by pointers to the Expression Data File, the reference to the value "100,000" in this example can be reused by many other statements as well.

Objects store criteria in the form of pointers to statements such as the example above, using the statements' identifiers. If an object's firing behavior depended solely on the example statement above, its relevance criteria would consist of the string "2947", i.e. this statement's identifier. Boolean operators which link statements in criteria sets are represented by an underscore ("_") for "AND", and a period (".") for "OR". Parentheses used to group statements in a set of criteria are stored literally. Thus, suppose object X had the following criteria:

|     |   | <statement 1, having identifier number: 0123> |   |
|-----|---|------------------------------------------------|---|
| AND | ( | <statement 2, having identifier number: 0234>  |   |
| OR  |   | <statement 3, having identifier number: 0345>  | ) |

This set of statements would be stored in the Object Data File as the character string:

0123_(0234.0345)

Other means of representing statements and expressions are certainly within the scope of the invention. For example, storage requirements for the knowledge base could be reduced by using a different pointer convention, where pointers are of shorter length.

Creating the Knowledge Base

The preferred implementation provides a computer program (the Knowledge Base Development Program 4) to facilitate the creation of applications, modules, and objects, and the editing of their attributes. A developer who wishes to create a new application selects "Create New Application" from a menu, and after certain information such as the application name and number are entered, the program creates the necessary files. A new module for an existing application is created in a similar fashion: after the developer provides a name and number for the new module, this data is added to the Object Data File's 40 application record.

Objects are always created and edited within the context of a particular module within an application. In order to work with objects, the developer opens the application and module of interest by selecting from a menu. "Opening" an application causes its files to be placed in use, and "opening" a module causes indexing information to be updated for all objects in the application's Object Data File 40. The ATT field of the Object Data File contains all attribute data for each module of which an object is a member. (see FIG. 5.) Those objects which are members of the module being opened have certain attribute data extracted from the module's data segment in the ATT field, and this data is placed in the ATX field for use in indexing. Objects which are not members of the module being opened will have a blank ATX field, for there is no data from the ATT field to extract and insert into the ATX field. This allows records with blank ATX fields to be filtered out, and the resulting set of records which are in use and available for editing are just those objects which are members of the opened module.

When a module has been opened, an "action" menu appears, giving the developer a choice of several alternative actions to perform. Options on this menu that relate to working with specific objects in the knowledge base are "Edit", "Create", and "Delete". Other options on the menu offer various utility and diagnostic services, such as a utility to create a report which lists the contents of the knowledge base for this module. Other possible options are the Validation Table Generator 5, the Natural Language Interpreter 6 and the Explanation and Diagnostic Utility 7. Another option on this action menu is "Create the Generated Data File", which invokes the Generator Program 8 to put information from the finished knowledge base in a file format suitable for processing the module as the intended expert system. Such processing will be performed by the Object Processing Program 9.

To edit the attributes of an object, the developer selects "Edit" from the action menu and is then presented with a menu of existing objects in this module. The developer has options for what objects are presented and for how this menu should be displayed. For example, the developer might direct the menu to display only internal conclusion objects, and to display them in alphabetical order rather than in their defined sequence order.

Selecting an object from this list opens that object for editing, and causes a menu of object attributes to appear. The developer selects the particular attribute to be edited for this object. Depending on the attribute involved, an appropriate interface is provided to facilitate the editing. For example, if the text of a screen object is to be edited, then a window opens showing the text that is currently assigned as the object's text attribute. The developer can make changes to this text and then save the new version.

To create a new object, the developer selects "Create" from the action menu, and must then enter the proposed name and sequence position for the new object. The system then checks to see if the object already exists. Several variations are now possible:

(1) If the object does exist and it is already a member of the module being edited, the creation action is rejected, for duplicate object names are not allowed.

(2) If the object exists as a member of one or more other modules, the effect of the creation action is to include it as a member of the current module as well. The assignment to the object of at least one attribute for the current module is enough to make it a member of the module. In this situation, the developer has the opportunity to copy the attributes of the object that have been assigned for purposes of another module to become its attributes for the current module as well, saving repetitive data entry.

(3) If the proposed object does not yet exist, a new record is added to the Object Data File 40 for it and a new system identifier number is assigned to it.

After an object is added to the current module, the normal editing process for its attributes begins.

Object deletions are handled in a similar manner. The developer chooses "Delete" from the action menu, and then selects from a list of current objects the object to be deleted. If the object is a member of the current module only, its record is removed from the Object Data File. If it is a member of one or more other modules as well as the current module, the developer is asked if the object should be removed from all modules, or only from the current module. If it is to be removed from all modules, the record is deleted from the Object Data File. If it is to be removed from this module only, its attribute data for this module is deleted, but the object's record is retained, and its attribute data for other modules is unaffected.

When an object is added or deleted from a module, the developer-defined positional sequence numbers for all objects in the module are adjusted to account for the change. When an object is deleted, all objects which contain references to it are visited and such references are removed, in order to maintain referential integrity among objects. If the deleted object was a member of other modules as well, and it was deleted from all modules, all objects in those modules must also be visited in order to remove references to it. If it was deleted only for purposes of the current module, this process is limited to just those objects within the current module.

Most attribute data that is entered for an object is stored directly in the object's ATT field in the Object Data File. For example, if a conclusion object is designed to import data from an external file, the instructions concerning the import operation to be performed are stored as a character string in the ATT field. If any action criteria are specified for the import operation, such criteria are stored together with the import instructions. Certain types of attribute information, however, are stored in the ATT field in the form of pointers to records in the other files of the knowledge base, the Statement Data File 42 and the Expression Data File 44.

If possible alternative values for an object are predefined, these values are stored in the Expression Data File, which is a repository for all unique values that have been identified in the knowledge base. For example, a screen object might ask the question "What is the type of purchase contract involved?" and supply a menu of predefined choices for the user to select among. Each of these predefined choices is a possible value for the object, and each is stored in the Expression Data File. Similarly, an internal conclusion object might have four alternative values that it might conclude under different fact situations, and these possible values could be either literal strings (e.g. "YES") or evaluatable expressions (e.g. one object's value added to another object's value). Each of these strings or expressions is stored as a value in the Expression Data File.

Each unique possible value in the Expression Data File is assigned a unique, 4-digit, numeric system identifier, and this identifier is stored as a value designator in the object's ATT field, serving as a pointer to the corresponding entry in the Expression Data File. In this way, possible values may be stored only once, and may be reused by other objects in the knowledge base.

To facilitate editing the relevance and action criteria of an object, an interface is provided for the "table view" of criteria, to support the entry and manipulation of criteria statements. In this interface, each statement occupies a row on the screen, and the rows are divided into columns according to the columns in the table view (see the section entitled. 'The "Table View" of criteria'). After the developer edits and chooses to save the new version of the table view, the statement set is stored as the criteria for the object. Relevance criteria for an object are a distinct attribute in their own right, while action criteria are stored together with the data elements to which they relate.

To facilitate the reuse of statements, and of the expressions used within statements, the storage of criteria sets is accomplished through the use of pointers to the Statement Data File 42 and Expression Data File 44. The Statement Data File is a table of unique statements that have been entered into the system, each with a unique, 4-digit identifier.

Creating the Generated Data File 14

To generate a usable system from the knowledge base that has been created, the objects in the knowledge base are organized by the Generator Program 8 into a linear sequence for processing, using a conventional topological sorting algorithm. This sequencing operation is based on identifying and taking into account all inter-object dependency relationships that have been created by the statements used in the objects' criteria sets, and by references to objects in other attributes (for example, an object value may be dynamically embedded directly into the text of another object, creating an inter-object dependency relationship without the involvement of a criteria statement). When the resulting system is executed, all objects are considered in sequence. The final sequence position of an object becomes an additional attribute of the object.

The notable feature of the resulting sequence is that all objects on which a given object depends (called its list of "upstream" objects) will precede it, and all objects which in turn depend on the given object (its "downstream" objects) will follow it. When sorting the objects into their final system sequence, they are considered in the sequence order specified by the developer. Therefore, the developer-defined sequence is respected to the extent possible. Only if an object must be moved to a different position in recognition of an unsatisfied inter-object dependency will the developer-defined sequence be disrupted. If an object must be moved, it is because it depends on some later object, and so it must be moved downward in the sequence to a position after the object on which it depends. It is inserted into the sequence position immediately following the required object.

An implication of this sequential sorting of objects is that incidences of circular reasoning may be identified by the system. If an object cannot be placed in the resulting sequence so that the sorting condition is met—i.e., so that all objects on which it depends precede it, and all objects dependent on it follow it—then there is some circular element to the object dependency relationships. For example, suppose object X depends on objects A, B and C, and objects D, E an F depend on X. Now suppose that object B depends on object F. X must be sequenced after B, F must follow X, yet B must be sequenced after F. Such circular references indicate a fault in the system logic, and must be resolved before the system may successfully be generated.

In the preferred embodiment, once the objects have been sequenced, a Generated Data File 14 is generated to hold all of the necessary data about the objects and the statements. (See FIG. 6.) The addresses of those bytes in the Generated Data File where each set of necessary data about each object and each statement begin are recorded in control strings (discussion below), so that when data is required about a statement or object, the Object Processing Program 9 can go to the appropriate Generated Data File address and retrieve all necessary data. This Generated Data File is accessed at runtime using low-level file functions, which allow direct manipulation of the file pointer. Certain application-level and module-level attribute data (such as the date the file was generated and version numbers) are placed in a Header string at the beginning of the Generated Data File.

An initial state of the system is also generated, in which object firing status and statement truth values are recorded in their initial states. In general, all statements are considered to be false in the initial state, and all objects are considered not to fire. However, there are exceptions to this general rule. Some objects always fire (for example, in order to collect initial data that is always required). By convention, such objects will have no assigned relevance criteria, and the initial system state calls for these objects to fire. Some statements are true at the outset: for example, suppose a statement, referring to the value of object X, reads:

X=="" (i.e., the value of object X is the null string)

This statement is true in the initial state of the system, for object X has not yet acquired a value. The initial system state will record a truth value of "true" for this statement. The Statement Queue Array 34 (see "Statement and Object Queue Arrays" below) will be preloaded with references to these statements at the start of processing 110.

Figure 6:
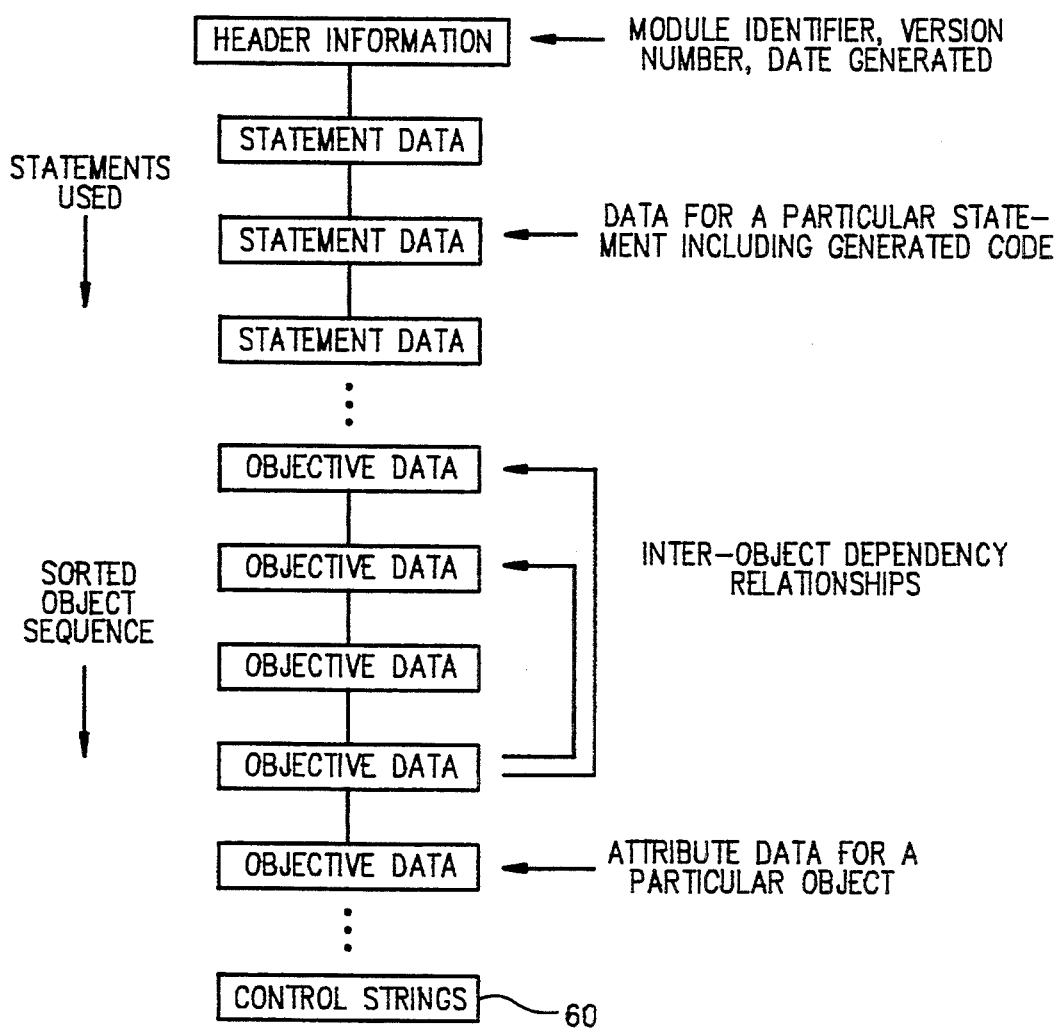
FIG. 6 shows the file structure of the generated data file.

As show in FIG. 6, the structure of the generated Data File is:
<Header information>
<Statement data>
<Object data>
<Control strings>

Statement data is represented as follows:
<the statement's identifier>
<generated code for the statement>
<list of pointers to objects that can be affected by the statement's truth value> (each pointer to an object is coupled with the sequence number of the object's designated controlling object (discussion below))
Object data is represented as follows:
<the object's identifier>
<all object attribute data, separated by attribute codes (see below)>
<list of pointers to objects that can be directly affected by the object> (each pointer to an object is coupled with the sequence number of the object's designated controlling object)
<list of pointers to statements that can be affected by the object> (each pointer to a statement is coupled with the sequence number of the statement's designated controlling object)
Control strings (see discussion below):
<Object Firing Control String> 20
<Statement Truth Control String> 22
<Default Value Control String> 24
<Object Address Control String> 26
<Statement Address Control String> 28

Attribute codes are internal separators in an object's attribute data that mark divisions between attributes. Each consists of a delimiter, followed by a code that describes the nature of the attribute whose data follows. If the text of an object was "Enter the amount of the mortgage:", its attribute data in the Generated Data File would include the segment:

...<delimiter><code>Enter the amount of the mortgage:<delimiter><next attribute's code and data>...

The Object Processing Program 9

The inferencing mechanism works by considering each object in a defined sequence. In its simplest form, each object is examined in turn, beginning at the start of the defined object sequence, and continuing until all objects have been evaluated and the sequence ends. When an object is evaluated, its relevance criteria are evaluated to determine if the object should fire. If not, the analysis moves on to evaluate the next object in the defined sequence of objects. If the object does fire, action is taken according to its defined attributes. A question may be asked of the user, a conclusion drawn, an importation or exportation of data performed, a subroutine executed, a message displayed, or a system variable updated. The object acquires a "value", and this value is recorded, to be used in the evaluation of criteria statements employed by subsequent objects. Typically, the values that are acquired by objects are stored in a temporary buffer or data file (the Object Values File 30), in which objects may be looked up and their values retrieved. (See FIG. 9).

Evaluation of a criteria statement occurs by treating it as a line of executable computer code, and executing it to receive a logical value in return. For example, in FoxPro, such an evaluation may be performed using the "&" operator (referred to as the "ampersand" operator or the "macro" operator). If X is a memory variable containing the character string "5>3", then the statement

Y=&X evaluates to "true" and stores a logical value of .T. to the variable Y. Without the ampersand (i.e., if the statement read "Y=X"), the statement would simply store the contents of X to Y, i.e. Y's new value would be the character string "5>3". With the ampersand, X's contents are evaluated and the result of the evaluation is stored to Y. Alternatively, FoxPro also provides an EVAL() function, designed to evaluate expressions, and this may be used in place of "&" operator.

In this fashion, a criteria statement may be stored to the memory variable X, and X may be evaluated to yield a logical truth value. References in the statement to objects must be provided with the current values of those objects, however, and this can be accomplished in at least two different ways.

(1) The values of the objects can be looked up in the Object Values File 30, and their literal values can be inserted into the statement in place of the object references, using string manipulation functions. For example, if the statement X takes the form "A>B", and A and B are objects, each of them would be looked up and their current values retrieved. If A's current value was 5, and B's value was 3, then the characters "5" and "3" would be inserted into the code string in place of the "A" and "B" characters. Several character string functions could be used for this work; one of these is Fox-Pro's STRTRAN() function, which translates instances of a given character in a string into another character:

X="A>B" (This is the initial version of the statement)

(Now retrieve current values of A and B. A=5, and B=3.) X=STRTRAN (X,"A","5") (Replace every instance of "A" in X with "5") (X's value is now: "5>B") X=STRTRAN(X,"B","3") (Replace every instance of "B" in X with "3") (X's value is now: "5>3", and now X is evaluatable with the "&" operator) Y=&X (Evaluates the contents of X, executing the assertion "5>3") Y now has the value of .T. (logical "true").

(2) An alternative method of evaluating the statement avoids such string manipulation and creates new memory variables, using the names of the objects. In the above example, when the current values of A and B are retrieved, two new variables, A and B, are created and these values are stored to the variables:

A=5
B=3

Now the content of X (the string "A>B") is directly executable:

Y=&X

FoxPro (or whatever language is being used) will recognize the references to the memory variables A and B, and will substitute their values in the evaluation of the statement, to yield the logical "true".

Because each object's relevance criteria statements are clustered with the object, the object can be considered for the first time when it is reached in the sequence. At that time, its criteria are examined and statements in its enabling pathways are evaluated, using the current values of any objects referenced in the statements. If a pathway succeeds, the object fires, and remaining pathways are not considered; if no pathway succeeds, the object does not fire and is ignored. An important consequence of this simple approach is that every object in the system will have its criteria evaluated.

In the preferred embodiment of the method, however, this simple approach of examining and evaluating each object in the sequence is made much more efficient through the use of dependency pointers and control strings. This approach allows the system to "look ahead" and efficiently propagate the implications of newly acquired information at the time such information is received. In this fashion, objects downstream in the analysis sequence can be "turned on", i.e. designated to fire in advance of reaching them in the sequence, if information acquired by upstream objects warrants that action. When system processing reaches an object in the defined sequence, its firing behavior will already have been determined.

One important implication of this approach is that not all objects need to be evaluated. In general, objects start out not firing, and if nothing occurs upstream in the analysis to change that status, the object will continue to not fire and when reached it can safely be bypassed without an explicit examination of its relevance criteria. This can lead to significant improvements in system performance, for potentially thousands of non-firing objects could be bypassed with essentially no processing.

Control Strings 60

To support this approach, control strings 60 are generated by the Generator Program 8 along with the system data to record the firing status of objects and the truth values of statements, and other required information. Several of these control strings are bitmaps (character strings consisting of ones and zeroes, such as "0011010110 . . . "), and some control strings store literal data. They are stored in Generated Data File 14.

One such control string (the Object Firing Control String 20) holds the firing status of objects in a bitmap, where a "1" means the object will fire and a "0" means it should not fire. Each object is represented in the control string as a single character, and objects are identified by their sequence numbers, which map positionally into the string. Thus if the Object Firing Control String begins with the series "1001000 . . . ", the first object in the sequence will fire, the next two objects do not fire, the fourth object fires, and the following three do not fire. This control string is constructed when the system is generated and the initial system state is described. There are as many digits in the string as there are objects; all objects are represented by zeroes, except for those objects that always fire, which are represented by ones.

A similar bitmap control string is generated for statement truth values (the Statement Truth Control String 22), in which statements that evaluate to "true" are represented by a "1" and statements that evaluate to "false" are represented by a "0". Here, since statements have no sequence, they are mapped into the control string using their unique identifying numbers. Thus, if the statement with an identifying number of "0147" evaluates to "true", then the 147th digit in the control string will be "1". When the initial system state is generated, all statements are represented with "0", except for those statements which initially are "true", which are represented with "1".

Processing in the system occurs by examining digits in the Object Firing Control String. The consultation begins by starting at the beginning of this control string, and terminates when the end of the string is reached. A pointer into the control string 112 is maintained to track the current position in the string (the object in this sequence position is referred to as the "current object"). At any point in the process, the pointer can be repositioned to a different place in the string, if desired. For example, if a user flags an earlier object for review, the system can jump back to that object and reprocess it simply by changing the value of the Object Firing Control String pointer.

In the Object Firing Control String, if the character being examined is "0", the object in that sequence position is considered irrelevant and is passed by. If the character is "1", the object fires, and may acquire a new value. This value change may cause changes to the truth values of statements that refer to the object. Such statements are flagged for evaluation, and this evaluation occurs after each flagged statement's controlling object (see below) is processed. If a statement's truth value changes, its representation in the Statement Truth Control String will flip from a "0" to a "1" (if it goes from false to true), or from a "1" to a "0" (true goes to false).

Changes to the truth value of statements in turn affect whether other objects downstream, whose behavior depends on the truth values of these statements, will fire. Such objects are flagged for evaluation, and this evaluation occurs after each flagged object's controlling object is processed. If an object's firing behavior changes, the representation for the object in the Object Firing Control String may flip from "0" to "1" (the object now fires), or from "1" to "0" (an object that was previously designated to fire will now not fire).

A Default Value Control String 24 is also created when the system is generated. A default value may be assigned as an attribute of an object, and this value must be assigned to the object during the consultation if the object does not fire. Since an unfiring object will generally not have its attribute data examined, and in most cases will not acquire a value, these special cases of default values must be recognized. To provide this capability, a Default Value Control String is generated which duplicates the Object Firing Control String. In this case, however, any "1" characters in the string designate objects that have a default value attribute, which should be assigned to the object if the object does not fire. If an object is being bypassed because its character in the Object Firing Control String is a "0", the Default Value Control String is consulted to see if the character for this object in that string is a "1". If so, the object data must be extracted from the Generated Data File 14 and the default value assigned to the object at that time.

Addresses in the Generated Data File where object and statement data sets begin are recorded in an Object Address Control String 26 and a Statement Address Control String 28. Object addresses map positionally into the Object Address Control String by object sequence number, i.e. the address for the 42nd object in the object sequence will be the 42nd address stored in the Object Address Control String. If the object in sequence position 42 is currently being processed, and it fires, the Object Processing Program 9 will need its data. To locate the data, the system will consult the Object Address Control String and extract the 42nd address. This is the byte address in the Generated Data File 14 for the start of this object's data. The file pointer in the Generated Data File is moved to that address, and the next sequence of data is read into memory. A delimiter marks the end of each object's data set.

Statement addresses are stored in the Statement Address Control String 28 and are coupled with statement identifier numbers. Statements are not sequenced in the system as objects are, and the Generated Data File for a given module will likely use a subset of all unique statements in the application. Therefore, the most efficient way to store statement addresses is by storing the statements' identifiers along with their addresses. Thus if a statement's identifier is "0165" the Statement Address Control String will be searched for this identifier, and the file address for the statement's data will be stored in the bytes immediately following this entry. To retrieve the statement's data, the file pointer in the Generated Data File is moved to this address and the data read into memory.

Since knowledge about object behavior is represented through the use of statements, and these statements create inter-object dependency relationships which are fully known once the knowledge base is defined, pointers can be generated by the Generator Program 8 along with other system data to indicate which statements and objects can be affected by changes in the values of particular statements and objects.

Objects and statements are treated separately in this pointer-based approach. Once the sequencing of objects has been accomplished, all inter-object dependency relationships have been identified. Similarly, it is known, from an examination of each of the unique statements used in the system, which statements can be affected by a change in the value of an object. Each object thus acquires as an additional attribute a list of all of the statements whose truth values can be affected by a change in its value. Correspondingly, each statement has an associated list of all of the objects whose behavior can be affected by a change in the truth value of the statement.

During execution of the resulting system, when an object changes value, the list of statements that can be affected by its value is consulted, and each statement in the list is flagged for a re-evaluation of its truth value. If, upon such a re-evaluation, a statement's truth value changes, the list of objects that can be affected by its truth value is consulted, and each object in the list is flagged for a re-evaluation of its firing behavior. In this manner, the consequences of newly acquired facts are propagated down the sequence of objects, causing new objects to be designated to fire when their turns come or suppressing the firing of other objects that otherwise would have fired.

When an object fires, it may have action criteria within its data which govern the behavior of attributes (for example, the criteria for concluding alternative values, or the criteria for importing a value). In these cases, the action criteria are evaluated directly when needed during the processing of the object. For example, if a conclusion object fires and it has several alternative values, the first alternative's action criteria will be examined. The action criteria statements are stored as statement identifiers, and for each such identifier, its corresponding character in the Statement Truth Control String is examined. If it is a "1", the statement is true under the current facts, and the next statement in the pathway is examined. If it is a "0", the entire pathway fails, and the next pathway will be examined. If no pathway succeeds, the value is not concluded, and the action criteria for the next alternative value in the series will be examined. Typically, the final alternative value in the series will have no action criteria assigned to it, and this value will always be assigned to the conclusion if this value is reached in the evaluation of the alternative values list.

It often happens that a user will interrupt the processing of the consultation in order to go back to a prior object to see a question or message again, and the user may change the response previously given to a question. When this happens, the consultation must proceed from that point and must reprocess objects that it processed during the first pass. The reprocessing of objects that have already acquired values creates a special situation in the consultation.

The changed value of the upstream object will trigger the re-evaluation of affected statements. If the truth value of an affected statement changes, affected objects will be reevaluated. Objects which have already been processed and whose firing behavior is unchanged by the change in the value of the upstream object will simply be bypassed in the second pass of the consultation. If they previously fired and acquired values, these values are accepted and the consultation moves on. In certain situations, however, an object that previously fired and that still fires on the second pass should be refired anyway. For example, an object which imports data from an external file should be refired, for the change in the value of the upstream object conceivably could change the behavior of the import operation or the value of the data that is imported. To handle these situations, a system flag 90 is set in the Object Values File 30 to signal that the object should be refired.

Controlling Objects

The imposition of a sequence for objects introduces the notion of a "controlling object". A given object will have references to other objects among its attributes, in the form of statements, text embeds, lookup keys for imported data, etc. These are its set of "upstream" objects: objects on which its behavior depends. The controlling object is that object in the set of upstream objects with the highest system sequence number.

Suppose object X, in its relevance criteria, refers to five upstream objects: A B C D and E. Among those five, the last to be considered, the one with the highest sequence number is the controlling object for X's evaluation: X cannot be evaluated properly until all five objects' values are known. Any prior attempt to evaluate X would be pointless, and would create additional, wasted processing. Therefore, an evaluation of X must wait until the controlling object is reached and evaluated.

Statements have controlling objects as well. A statement may refer to various objects, one of which will have the highest system sequence number. The statement cannot be evaluated properly until all of these objects' values are known, i.e. until its controlling object is processed.

Therefore, among the attributes of an object is the list of pointers to statements which it can affect, and for each such statement, the controlling object of the statement is noted. For each statement that can be affected, a composite pointer is built consisting of the sequence number of the statement's controlling object, and the identifier of the statement to be evaluated. This composite pointer is added to the Statement Queue Array (see below) when the object's value changes, in order to flag the statement for re-evaluation.

Each statement's data, in turn, contains a list of objects which use the statement, and the controlling object of each of those objects is noted. For each such object that can be affected, a composite pointer is built consisting of the sequence number of object's controlling object, and the sequence number of the object to be evaluated. This composite pointer is added to the Object Queue Array (see below) when the statement's truth value changes, in order to flag the object for re-evaluation.

Finally, while statements can only affect objects, objects not only can affect statements but can also affect other objects directly as well. This is called a Direct Object Link. For example, where an object's value is embedded in another object's text, a change in the embedded value will affect the object's text and might create a need to redisplay it. Composite pointers for Direct Object Links, consisting of the sequence number of linked object's controlling object, and the sequence number of the linked object, are also built and included among an object's attributes if it has such links. When the value of the object changes, the composite pointers to linked objects are added to the Object Queue Array. Furthermore, the system flag 90 in the Object Values File 30 is set to force a refiring of the linkedto object when it is reached.

The design goals sought in the generation of the system and in the overall processing algorithm are to minimize generated data in the Generated Data File 14, and to minimize computation time at execution. The truth value of a statement should be evaluated only when it needs to be: when one of its inputs has changed value and the consultation has reached the statement's controlling object. Similarly, an object's relevance criteria should be evaluated only if necessary: when the truth value has changed for one of the statements on which it depends, and the consultation has reached the object's controlling object.

Statement and Object Queue Arrays 32, 34

In order to support the flagging of statements and objects for re-evaluation, two arrays created at the time of execution are used as queues to hold pointers to flagged entities. One array is the Statement Queue Array 34, which contains pointers to flagged statements, and the other is the Object Queue Array 32, which contains pointers to flagged objects.

Before leaving an object and going on to the next one in the sequence, the Statement Queue Array must be examined to determine if the current object is the controlling object for any statements in the queue. If so, those statements are to be reevaluated at this point. Similarly, before leaving an object, the Object Queue Array must be examined to determine if the current object is the controlling object for any objects in the queue. If so, those objects are to be re-evaluated at this point.

Upon acquiring a new value for an object, the object's list of all statements that use this object is examined. These statements are added to the Statement Queue Array using a composite pointer which identifies the statement's controlling object, and each will be evaluated when its controlling object is reached. In some cases, that is the object currently being processed. For example, suppose a statement reads "{OBJECT_7}>0". When OBJECT_7 is processed and acquires a value, this statement is one of the statements that can be affected by the value, so a pointer to the statement should be added to the Statement Queue Array. Since the statement depends on OBJECT_7 only, OBJECT_7 is also the statement's controlling object, so the statement should be evaluated before leaving OBJECT_7. The order of processing events is:
 (1) Acquire a value for OBJECT_7
 (2) Add a pointer for this statement to the Statement Queue Array
 (3) Before leaving OBJECT_7, search the Statement Queue Array to see if OBJECT_7 is the controlling object for any statements. If so, evaluate those statements.

Figure 8:
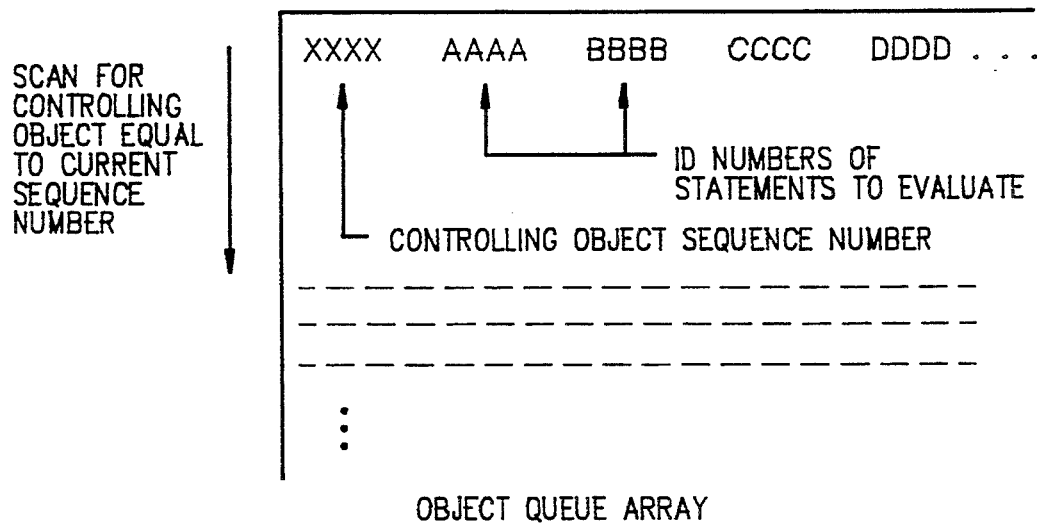
FIG. 8 shows the data structure of the queue arrays.

The Statement Queue Array holds pointers to statements that have been flagged because of changes in value for referenced objects. For a statement in this queue, the array holds a composite pointer containing the sequence number of the statement's controlling object, and the identifier of the statement. When that controlling object is reached, the reference to this statement is recognized and removed from the array. For efficient searching of the array, controlling objects are listed only once, at the beginning of each data element in the array. Following each unique controlling object sequence number is a list of all statements (in the Statement Queue Array) or objects (in the Object Queue Array) which have been flagged for re-evaluation when the controlling object has been processed. The array is scanned to find the controlling object of interest. If it is found, its list of statements or objects is read into memory for processing, and the data element containing the controlling object and its list is removed from the array (See FIG. 8).

The statement's identifier is used to find and extract from the Statement Address Control String the address in the Generated Data File where the statement's data begins. The file pointer in the Generated Data File is moved to that address, and the statement's data is read into memory. This data set includes the line of code that was generated for the statement by the Generator Program 8, and also the list of objects that can be affected by a change in the statement's truth value.

The generated code for the statement is extracted from this data. References to objects in a statement's generated code take the form of an "O", followed by an underscore, followed by the object's unique identifier, i.e. "O_3649". For each such instance of an object reference, the current value of the object is retrieved from the Object Values File, and a temporary memory variable is created to hold the value. This variable has the same name as the object reference in the generated code, i.e. "O_3649". When all such object references have thus been transformed into references to temporary memory variables, the statement is evaluated for truth. The resulting truth value is then compared to the current truth value for the statement in question.

If the statement's truth value has changed, the new truth value is recorded, and the statement's list of affected objects is consulted. For each such object, the object's firing status may be affected by the changed truth value of the statement. However, more efficiency can be obtained by noting that in some cases the changed truth value cannot affect the object's behavior, because of the firing bias. In the preferred embodiment, the firing bias calls for firing an object only when it's relevance criteria statements evaluate to "true". Therefore, the effect of a statement's truth value going from "false" to "true" can only be to contribute toward causing the object in question to fire. But if the object is already marked for firing (because one of its other criteria pathways has already been satisfied, for example), the object's firing status cannot change and the point is moot. In such a case, there is no point in adding a reference to the object to the Object Queue Array for re-evaluation.

Similarly, if a statement's truth value changes from "true" to "false", it will contribute toward causing the object not to fire. But if the object is already not firing, nothing can change, and again no purpose can be served by adding it to the Object Queue Array to mark it for re-evaluation.

For those objects, then, where the statement's new truth value works at cross-purposes to the object's current firing status, a reference is added to the Object Queue Array to flag the object for re-evaluation. This reference consists of the sequence number of the controlling object for the object in question, and the sequence number of the object to be re-evaluated.

A similar process occurs when the controlling object is reached for an object referenced in the Object Queue Array. The reference is recognized and removed from the Object Queue Array, and the file address for the object to be evaluated is extracted from the Object Address Control String 26. The file pointer is moved in the Generated Data File to the noted address, which marks the beginning of the object's data. This data is read into memory. Included in this data is the object's set of references to relevance criteria statements, expanded into standalone pathways, each of which if satisfied is sufficient to cause the object to fire. Each statement in a pathway is referenced by its unique identifying number. The truth value of each statement is retrieved by examining the statement's character in the Statement Truth Control String. When a false statement is encountered, evaluation of that pathway stops and an evaluation of the next pathway commences. When all of a given pathway's statements are found to be true, the object fires and evaluation stops. If all pathways have been examined without finding one that succeeded, the object does not fire. The Object Firing Control String is then updated to reflect the new firing status of the object, if the firing status changed.

In this two-tier approach to the inferencing strategy, in which the evaluation of statements and objects are separated and pointers are used to flag statements and objects for reevaluation, we see that maximum possible efficiency is attained, because:

(1) Action in the system is initiated only in response to changes in the value of an object;
(2) In response to a change in an object's value:
 (a) only those statements in the system that can be affected by the change are evaluated,
 (b) each such statement is evaluated only once, at the point where its controlling object is reached and therefore all of its inputs are known;
(3) In response to a change in a statement's value:
 (a) only those objects whose current firing behavior in the system can be affected by the change are evaluated, taking into account not only the object's dependence on the statement, but also a comparison of the statement's current truth value and the object's current firing status,
 (b) each such object is evaluated only once, at the point where its controlling object is reached and therefore all of its inputs are known.

Knowledge Base to Natural Language Interpreter 6

Natural language versions of relevance and action criteria for each object in the system are highly useful for system documentation and development. Such interpreted versions also provide an effective way to communicate the knowledge being encoded into the system to interested parties outside the development process, who may be helpful in verifying the accuracy and appropriateness of the expertise being captured.

The invention includes a Knowledge Base to Natural Language Interpreter Program 6 which is a computer program that uses object translation attributes to create natural language versions of relevance criteria statements 12. For a given object, its relevance criteria are retrieved from the Objects Data File 40. Each statement's pointer is followed to the corresponding record in the Statements Data File 42, and the left-side and right-side 4-digit pointer elements of the 9-digit encoded statement are extracted. These are looked up in the Expressions Data File 44, and the expressions are retrieved. The fifth digit in the statement's 9-digit representation identifies a particular operator symbol. These elements are combined as follows to form the statement:

<left-side expression> <operator symbol>
    <right-side expression>

This statement is then parsed to examine its elements. For each instance of an object reference in the statement, the referenced object is looked up in the Object Data File, and its translation attribute is extracted and substituted for the object reference in the expression. A standard natural language version is substituted for the operator symbol (for example, the phrase "is greater than or equal to" is substituted for the symbol ">=" in the statement).

Other symbols that appear in the expressions used will also have natural language alternatives used in their place. For example, "+" will become "plus", "/" will become "divided by", etc. Combinations of objects are also translated into a more natural representation. For example, "<object translation>+<another object's translation>" will become "the sum of <object translation> and <another object's translation>". Parentheses and logical operators remain unchanged. Certainty factors become "with a certainty factor of at least <certainty factor value>".

The resulting interpretation of the relevance criteria is also processed to ensure that sentences begin with capital letters, and that appropriate punctuation and connecting articles are present. Preamble text is added, referencing the translation and the object type attribute of the object whose relevance criteria is being interpreted. Standard text is also included to cover special situations, such as the case where no action criteria are specified for a possible value (i.e., it always will be assigned).

Here is an example of the process and the resulting interpretation of relevance and action criteria for an object:

From the Objects Data File:

| Attribute | Value |
|---|---|
| Object name: | MGMTAPPROV |
| Object type: | Conclusion |
| Translation: | Required management approval |
| Relevance Criteria: | 9182      ← pointers to Statements |
| Possible Values: | YES█0321_(0432.0543)|NO    ← Data File |

From the Statements Data File:

| Statement ID | Statement | (encoded form, with pointers to the Expressions Data File) |
|---|---|---|
| 9182 | 975310987 | |
| 0321 | 065430765 | ← (left pointer: 0654 |
| 0432 | 087610987 | (operator: 3 |
| 0543 | 123454321 | (right pointer: 0765 |

From the Expressions Data File:

| Expression ID | Expression | |
|---|---|---|
| 9753 | {8163} | ← object references are in curly |
| 0654 | {0246} | brackets and use object ID |
| 0765 | 25000 | numbers as pointers to the |
| 0876 | {0357} | Objects Data File |
| 0987 | YES | |
| 1234 | {0468} + {0680}/{5432} | |

-continued

| 4321 | {6543} |
|---|---|

From the Objects Data File:

| Object ID: | 8163 |
|---|---|
| Object name: | STDTYPE |
| Translation: | Contract type is "Standard" |
| Object ID: | 0246 |
| Object name: | CONTVALUE |
| Translation: | Contract value |
| Object ID: | 0357 |
| Object name: | WARRANTINV |
| Translation: | Warranties are involved |
| Object ID: | 0468 |
| Object name: | HISTPAID |
| Translation: | Historical payments made |
| Object ID: | 0680 |
| Object name: | PENDORDER |
| Translation: | Value of pending orders including the current one |
| Object ID: | 5432 |
| Object name: | YRSHIST |
| Translation: | Number of years of this relationship |
| Object ID: | 6543 |
| Object name: | AVEANNUAL |
| Translation: | Average annual order value for all customers |

Standard operator translations:

| Number | Operator | Translation |
|---|---|---|
| 1 | = | equal to |
| 2 | # | not equal to |
| 3 | > | greater than |
| 4 | < | less than |
| 5 | >= | greater than or equal to |
| 6 | <= | less than or equal to |
| 7 | $ | contained in |
| 8 | !$ | not contained in |

The resulting natural language interpretation 12:
    The Conclusion object for required management approval will fire if:
        Contract type is "Standard" is equal to YES.
    A value of "YES" will be assigned to this object if:
        Contract value is greater than 25000
    AND    either warranties are involved is equal to YES,
    OR     the sum of historical payments made and the value of pending orders including the current one, when divided by the number of years of this relationship, is greater than or equal to the average annual order value for all customers.
    A value of "NO" will be assigned in all remaining cases.

Explanation and Diagnostic Utility 7

The invention includes an Explanation and Diagnostic Utility which allows the developer and/or the user to examine the reasoning processes at work in the system. This utility is part of both the Knowledge Base Development Program 4 and the Object Processing Program 9. A request for an explanation is usually asking one of the following questions:
    Why is this question being asked?
    Why is this question or conclusion relevant?
    How was that conclusion drawn?
    Why is this message or output being asserted as true?

In each case, what is being requested is an explanation for the behavior of a particular object, i.e. why did the object fire. A less common request, but one which can be quite illuminating for a user, is: "why did this object NOT fire?" Very few expert systems have the capability to explain why events did not happen.

To explain to the user the reasoning used in the analysis to arrive at a certain result, the Explanation and Diagnostic Utility looks to the relevance criteria of the objects involved, and constructs a natural language explanation 13 based on the relevance criteria statements found. Each object in the knowledge base has a set of relevance criteria statements (except for objects that always fire, which are trivial to explain), and this set of statements constitutes a complete enumeration of how the object should behave. Therefore, the explanation process for an object that fired is simply to examine its relevance criteria, determine which statements evaluated to "true", identify the pathway(s) that succeeded, and construct the explanation using those statements. In the case of explaining why an object did not fire, each pathway is examined and the statement(s) which evaluated to "false" are identified and presented as requirements that were not satisfied, collectively causing each of the possible pathways to fail.

When a request for explanation is initiated by the user, the system retrieves the data for the object from the Generated Data File 14. The alternative pathways for firing the object are extracted from this data, and each statement within each pathway is evaluated for truth by examining its character in the Statement Truth Control String 22. Successful pathways are identified, as are the statements which will be used in the explanation. The data for each such statement is then retrieved and its generated code is extracted. A natural language version of the statement is created by substituting object translations for object references within the code statement, by using natural language versions of the operators used, and by presenting the current values of referenced objects to support the truth values of the statements.

For example, suppose an object fires and asks a question of the user, and the user requests an explanation for why this question is being asked. The object's data includes its relevance criteria statements. Suppose there are two alternative pathways, each consisting of a single statement. The truth values of the two statements are looked up in the Statement Truth Control String, and it is determined that the object's second pathway caused the object to fire because only the second statement evaluates to "true". The second statement's address in the Generated Data File is ascertained by consulting the Statement Address Control String 28, and the statement's data is retrieved. Suppose that the statement's generated code reads as follows:

O_0245+O_3299> = 100,000

The current values for the two objects referenced are retrieved from the Object Values File 30. That file also records the sequence number of each object. These sequence numbers allow the object's address in the Generated Data File to be identified by consulting the Object Address Control String 26. Each object's data is read into memory and its translation is ascertained. Suppose the translation for the object with the identifier "0245" is "the number of units manufactured last year", and the translation for object "3299" is "the number of units ordered this year", and that their current values are 65,000 units and 40,000 units, respectively. The resulting explanation would be presented to the user on screen, as follows:

This question is asked because the number of units manufactured last year plus the number of units ordered this year is greater than or equal to 100,000.

The number of units manufactured last year: 65,000
The number of units ordered this year: 40,000

Object translations in the explanation text are highlighted in a different color, so that the user knows these represent other objects in the system. Each such highlighted text region behaves like a menu option. If the user selects "The number of units manufactured last year", the explanation process is repeated for object "0245", and an explanation for that object will appear on screen. This allows the user to follow the system's reasoning backward, to see what logic applied and to check the values of the objects involved.

The Explanation and Diagnostic Utility is also used at the development level in order to diagnose and debug object firing behavior during development. Developers can evaluate the behavior of any object, and by selecting displayed translations as menu options, can follow links between objects, navigating inter-object dependency relationships at will.

Knowledge Base Diagramming Utility 16

As a supporting program for the listing of the knowledge base for documentation purposes, a program produces a diagram of all inter-object dependency relationships as a pictorial form of documentation 17. The program examines all attributes of each object in the defined sequence to identify all objects on which it depends. A file is produced showing all objects, with connecting lines drawn between objects to represent all dependency relationships.

Example of an Application

For illustration purposes, here is a trivial expert system to evaluate the advisability of buying or selling stock. If the stock is currently owned, the system will evaluate the historical cost of the stock owned, and compare it with the current price per share. It will recommend selling the stock if a gain can be realized on the sale, else it will recommend holding the stock. If the stock is not currently owned, the system will look to see how much cash is available in the investment account, and report how many shares of the stock could be purchased with available funds. For simplicity of illustration, the possibility of buying additional shares of a stock that is currently owned is ignored, and commissions on the transactions involved are also ignored.

Each object can have numerous possible attributes. In this example, only those attributes of immediate interest are shown, for clarity of presentation.

The knowledge base will require an application record to hold application-wide and module-specific attributes:

| Attributes | Values |
| --- | --- |
| Application number: | 1 |
| Application name: | Simple Stock Advisor |
| Module number: | 1 |
| Module name: | Simple Stock Advisor |

In this simple application, we are calling the application as a whole Application 1. It has one module, which is given the number 1. In an application that had more than one module, each module would be given an individual name, and each such name would likely differ from that of the application as a whole.

Now the following objects are created:

| Attributes | Values |
| --- | --- |
| Name: | STOCKNAME |
| Type: | Screen, user input |
| Sequence: | 1 |
| Answer length: | 25 |
| Text: | Enter the name of the stock: |
| Criteria: | <none> |
| Valid: | LEN(ALLTRIM({STOCKNAME})) > 0 |
| Error: | You must provide the name of a stock here. |
| Name: | PRICENOW |
| Type: | Conclusion, import |
| Sequence: | 2 |
| Import: | MARKET.DBF/MKTNAMES.IDX/{STOCKNAME}/PRICE |
| Criteria: | <none> |
| Name: | VALIDSTOCK |
| Type: | Conclusion |
| Sequence: | 3 |
| Values: | YES■{PRICENOW} > 0 | NO |
| Criteria: | <none> |
| Name: | NOSTOCKMSG |
| Type: | Screen, message |
| Sequence: | 4 |
| Text: | I could not find a stock listed under the name: {STOCKNAME}. Please be sure you have the correct name for your stock of interest. |
| Criteria: | {VALIDSTOCK} = NO |
| Name: | STARTOVER |
| Type: | System |
| Sequence: | 5 |
| Values: | Reset |
| Criteria: | {VALIDSTOCK} = NO |
| Name: | OWNEDSHARES |
| Type: | Conclusion, import |
| Sequence: | 6 |
| Import: | PRTFOLIO.DBF/STKNAME.IDX/{STOCKNAME}/SHARES |
| Criteria: | <none> |
| Name: | OWNSTOCK |
| Type: | Conclusion |
| Sequence: | 7 |
| Values: | YES■{OWNEDSHARES} > 0 | NO |
| Criteria: | <none> |
| Name: | COSTPERSHR |
| Type: | Conclusion, import |
| Sequence: | 8 |
| Import: | PRTFOLIO.DBF/STKNAME.IDX/{STOCKNAME}/COST_SHR |
| Criteria: | {OWNSTOCK} = YES |
| Name: | TOTALCOST |
| Type: | Conclusion |
| Sequence: | 9 |
| Values: | {COSTPERSHR} * {OWNEDSHARES} |
| Criteria: | {OWNSTOCK} = YES |
| Name: | CASHAVAIL |
| Type: | Conclusion, import |
| Sequence: | 10 |
| Import: | INVEST.DBF/FACTORS.IDX/"Cash Available"/AMOUNT |
| Criteria: | {OWNSTOCK} = NO |
| Name: | SALEVALUE |
| Type: | Conclusion |
| Sequence: | 11 |
| Values: | {PRICENOW} * {OWNEDSHARES} |
| Criteria: | {OWNSTOCK} = YES |
| Name: | BUYABLE_SHARES |
| Type: | Conclusion |
| Sequence: | 12 |
| Values: | INT({CASHAVAIL}/{PRICENOW}) |
| Criteria: | {OWNSTOCK} = NO |
| Name: | BUYVALUE |
| Type: | Conclusion |
| Sequence: | 13 |
| Values: | {PRICENOW} * {BUYABLE_SHARES} |
| Criteria: | {OWNSTOCK} = NO |
| Name: | GAIN |
| Type: | Conclusion |
| Sequence: | 14 |
| Values: | {SALEVALUE} − {TOTALCOST} |
| Criteria: | {OWNSTOCK} = YES |
| Name: | OWN_RECOMMEND |
| Type: | Conclusion |
| Sequence: | 15 |
| Values: | SELL■{GAIN} > 0 | HOLD■{GAIN} < = 0 |
| Criteria: | {OWNSTOCK} = YES |
| Name: | NEW_RECOMMEND |

-continued

| Attributes | Values |
|---|---|
| Type: | Conclusion |
| Sequence: | 16 |
| Values: | BUY■{BUYABLE_SHARES} > 0 \| DO NOTHING |
| Criteria: | {OWNSTOCK} = NO |
| Name: | RECOMMENDATION |
| Type: | Conclusion |
| Sequence: | 17 |
| Values: | {OWN_RECOMMEND}■{OWNSTOCK} = YES \| {NEW_RECOMMEND} |
| Criteria: | <none> |
| Name: | BUYMSG |
| Type: | Screen (message), Output |
| Sequence: | 18 |
| Text: | The stock being considered is: {STOCKNAME} I recommend that you buy {BUYABLE_SHARES} shares of this stock at the current market price of {PRICENOW} per share. The total value of this transaction would be ${BUYVALUE}. |
| Criteria: | {RECOMMENDATION} = BUY |
| Name: | SELLMSG |
| Type: | Screen (message), Output |
| Sequence: | 19 |
| Text: | The stock being considered is: {STOCKNAME} I recommend that you sell the {OWNED_SHARES} shares of this stock that you now own, at the current market price of {PRICENOW} per share. The total proceeds from this transaction would be ${SALEVALUE}. Your cost for these shares is ${TOTALCOST}, and your resulting gain is therefore ${GAIN}. |
| Criteria: | {RECOMMENDATION} = SELL |
| Name: | HOLDMSG |
| Type: | Screen (message), Output |
| Sequence: | 20 |
| Text: | The stock being considered is: {STOCKNAME} I recommend that you hold the {OWNED_SHARES} shares of this stock that you now own. The current market price of the stock is {PRICENOW} per share. Your average cost for these shares is ${COSTPERSHR} per share, and if you sold your shares the resulting loss would therefore be ${GAIN}. |
| Criteria: | {RECOMMENDATION} = HOLD |
| Name: | NOTHINGMSG |
| Type: | Screen (message), Output |
| Sequence: | 21 |
| Text: | The stock being considered is: {STOCKNAME} I recommend that you do nothing with respect to this stock. You do not own any shares at this time, and there is no cash available in your investment account to enable a purchase of shares. |
| Criteria: | {RECOMMENDATION} = DO NOTHING |

Narrative description of system operation

When the system is run, the first object, STOCKNAME, is processed. There are no relevance criteria specified for this object, so it always fires. It asks the user to enter the name of the stock of interest, allowing 25 characters for the stock name. A validity test is included as an attribute of the object which requires that the stock name not be blank. The test applies the ALLTRIM() function to strip leading and trailing spaces from the character string, and tests to see that the remaining string length is greater than zero. If not, the entire 25 characters were left blank and the error message is displayed, followed by another opportunity to enter a stock name (pressing the Escape key would terminate the consultation).

When a name is entered, the consultation proceeds to the next object, PRICENOW. This is an import that looks to an external data file of all stocks (MARKET.DBF), which is indexed by stock name (MKTNAMES.IDX). No action criteria are assigned to the import, so it is always attempted. The value of the STOCKNAME object is used as an index key and the system will try to locate a record for the stock of interest. (Curly brackets ("{}") always indicate a reference to an object.)

If the stock is found in the file, the value of the record's PRICE field of the MARKET.DBF database will be returned, to become the value of the PRICENOW object. If the stock is not found, the import fails, and the value returned will be zero.

The next object, VALIDSTOCK, uses the value of the PRICENOW object to determine whether the stock name entered exists. If the value is greater than zero, the import must have succeeded, and a value of "YES" is assigned to the VALIDSTOCK object. Note the format of the Values attribute for this object. Possible values are separated by the character "|". Within a value, action criteria for that particular value follow the value itself, separated by the character "■" (ASCII 254).

Values are evaluated in the order specified in the attribute. If the value of the PRICENOW object is zero, then the import failed. When considering the first value for VALIDSTOCK, the action criteria statement for the YES value ({PRICENOW}>0) will evaluate to false, and therefore the YES value will be rejected. The next value in the series, NO, has no associated action criteria, and therefore it is always assigned. Note that the sequential evaluation of candidate values in effect implies action criteria for the NO value. If the action criteria for the earlier value are satisfied, the NO value is never considered. If it is considered, then all earlier criteria have failed, and this value covers all remaining cases.

No relevance criteria are specified for the PRICENOW and VALIDSTOCK objects, for we always want to fire them in order to ensure that we are dealing with a valid stock.

The NOSTOCKMSG object will fire only if its relevance criteria are satisfied, i.e. only if the value of the VALIDSTOCK object is equal to NO. If VALIDSTOCK=YES, then this object will simply be bypassed as inapplicable. If it fires, it displays its text as a message on the screen, and asks that the user press any key to continue after reading the message.

Note the embedded value of the STOCKNAME object in the text of this screen message object. When formatting the text for this display, the system will evaluate this embedded object reference and will substitute the user-entered stock name for the reference. The first line of the message might therefore read:

I could not find a stock listed under the name: ACME PRODUCTS.

Note also that, except where such an embedded object reference is substituted, all text in the text attribute will be displayed as formatted, including the period after the embedded reference.

If VALIDSTOCK=NO, then the next object, STARTOVER, will fire, else it will be ignored. This is a system object to initiate the "reset" action, which will release all object values and start the consultation over again from the beginning.

Note here the importance of the fact that all objects are processed in a pre-determined sequence. The remaining objects in the consultation are processed only if the consultation successfully passes the STARTOVER object: all subsequent objects may therefore assume that a valid stock name is being considered. The practical effect of this assumption is that no further references to the value of the VALIDSTOCK object are required in the relevance criteria of following objects. For example, the next object in the sequence, OWNEDSHARES, has no relevance criteria and will therefore always fire. A reasonable criteria statement for firing this and all subsequent objects might be "{VALIDSTOCK}=YES", but this is represented implicitly by the fact that the object is being processed at all.

The OWNEDSHARES object imports the number of shares of the stock currently owned from the external data file PRTFOLIO.DBF. This file is also indexed by stock name, and the value of STOCKNAME is again used to locate the appropriate record. The value of the SHARES field of the PRTFOLIO data file is returned to become the value of the OWNEDSHARES object. If the stock cannot be located in the file, the import fails and the value of this object is zero.

The OWNSTOCK object that is processed next determines whether the stock is currently owned, based on the value obtained by the OWNEDSHARES import. This object now becomes a watershed in the analysis, for the behavior of the remainder of the analysis will be affected by whether the stock is currently owned. Thus the relevance criteria of following objects will make frequent references to this object.

Note that this object in effect serves some of the functions of a node in a decision tree, causing the logic of the system to branch. If the logic at work here were to be represented as a flow chart or a decision tree, the analysis would branch one direction or the other, based on whether stock was in fact owned. This can be referred to as "pruning" the decision tree (i.e. rejecting from the analysis the paths not taken), thus reducing the search space of the analysis.

The next object, COSTPERSHR, performs another import to retrieve the historical cost per share of the shares owned. This object will fire only if the stock is in fact owned.

The TOTALCOST object that follows is a simple calculation of the total cost of the owned stock, obtained by multiplying the number of shares owned by the cost per share.

CASHAVAIL is an import from another external file, INVEST.DBF. This file, for purposes of illustration, is a hypothetical file which contains information of interest to the investor, including the amount of cash available for purchasing new stock. This object fires if the stock of interest is not currently owned: the system is checking to see if funds are available to purchase the stock. The INVEST file is a data file indexed on various descriptive phrases which might be factors of interest to the investor. The lookup index key in this case is the phrase "Cash Available", and the value of the AMOUNT field is returned.

The next object, SALEVALUE, computes the proceeds resulting from the sale of owned stock. It multiplies the current market price by the number of shares currently owned. It fires only if stock is in fact currently owned.

The BUYABLE_SHARES object divides the current market price per share of the stock into the available cash to calculate how many shares of the stock could be purchased. The INT() function is used to return just the integer portion of this calculation, to avoid fractional shares. This calculation is only performed if the stock is not currently owned. The next object, BUYVALUE, computes the total cost of such a purchase, which may be something less than the cash available if the BUYABLE_SHARES calculation resulted in fractional shares.

The next object, GAIN, computes the difference between the potential total sale value of owned stock and the total historical cost of the stock, to yield a gain (or loss, if negative) on a sale. This calculation of course only occurs if stock is owned.

Two conclusion objects now follow, OWN RECOMMEND and NEW_RECOMMEND. If stock is currently owned, the OWN_RECOMMEND object looks to the GAIN object to determine if a sale of the stock would result in a gain or a loss, and recommends SELL or HOLD accordingly. If the stock is not currently owned, the NEW_RECOMMEND object checks the value of the BUYABLE_SHARES object to see if it is possible to buy any shares at this time. If so, it recommends a BUY, else it advises the investor to DO NOTHING.

A following conclusion object, RECOMMENDATION, collects the various possible recommendations of the system in a single object, to which later objects may conveniently point. Alternatively, these three objects could have been handled in a single RECOMMENDATION object which would cover all of the possibilities at once with somewhat more complex action criteria for the possible values:

(3) Modules calling other modules

Support is also provided for systems to call other expert systems as modules to perform sub-tasks, creating new values or updating the values of objects that have already been processed, whereupon program control returns to the calling module. In the current implementation, the system being called must be another module of the same application, because object names and identifiers may be duplicated in different applications, but are not allowed to be duplicated within mod-

| Values: | SELL■{OWNSTOCK = YES} AND {GAIN} > 0 \| HOLD■{OWNSTOCK = YES} AND {GAIN} < = 0 \| BUY■{OWNSTOCK = NO} AND {BUYABLE_SHARES} > 0 \| DO NOTHING |
|---|---|

Finally, each of the four possible recommendations of the system has an associated message advising the user what to do. Various object values are embedded in these messages, in order to present appropriate information about the circumstances and possibilities. Because of their mutually exclusive relevance criteria, one and only one of these message alternatives will in fact fire.

These message objects are also designated as Output objects. The message object that fires will have its formatted text preserved, complete with embedded values, and this text can be stored to a file or printed as a page of results. Alternatively, the object's system identifier can be written to an external file, in order to identify the output of the consultation. Another system might use this result as one of its inputs. Program Control Variations Many problems can be addressed simply by starting at the beginning of the object sequence and processing all objects until the end of the sequence is reached, whereupon the system terminates its execution. Some problems, however, require different approaches to program control. These are discussed below.

(1) Repetitive or "Batch" operations

Batch jobs, for example, are supported by providing a system reset capability and putting the system in a loop for repeated executions. In this arrangement, the system typically imports a set of data and operates on it by processing the full set of objects, taking appropriate action with the data and the results of the analysis. The system then resets itself back to its initial state, imports the next batch of data, and repeats the process until some terminating condition is satisfied to allow an exit from the loop.

(2) Progressive Refinement

In a different type of cyclical control structure, the system performs successive passes on the same set of data, refining it each time, until some terminating condition is reached. The first pass through the object list allows a high-level or "coarse-grained" manipulation of the data. Each subsequent pass takes the results of the previous pass as its input, performing more "fine-grained" manipulation.

Such cycles may also be built into a segment of what is otherwise a "single-pass" set of objects. This is supported by system "go-to" objects which, in the absence of a specified terminating condition (which might be a logical value, end-of-file condition in some external data file, or a specified number of iterations), reset the object counter back to some earlier object in the Object Firing Control String 20. This creates in effect a "do-while" looping construct within the otherwise linear set of objects.

ules of the same application.

A system object in the calling module performs the call to the other system. In the process, the current state of the calling module is saved, by saving to a file on disk important memory variables, including the current object counter 112, the Statement and Object Queue Arrays 34, 32 and the Control Strings 20–26. The Generated Data File 14 for the calling module is closed, but the Object Values File 30 remains open and unchanged for use by the called module. However, a copy is created of the Object Values File as it exists at the time of the call, for use when program control returns. Processing then begins for the called module, which opens its own Generated Data File and proceeds with its consultation 15. The called module may in turn call another module, and there is no limitation on the degree to which such inter-module calls may be nested.

Objects are reused within an application by being members of more than one module. If an object that is common to the two modules has been processed by the calling module, and is therefore found by the called module in the existing Object Values File, its value is accepted and used in the called module's consultation. The value of a common object may also be updated as a result of the called module's analysis. Note that almost all attributes of a common object may differ in the two modules. In particular, the firing behavior of the object may differ, because different relevance criteria and inter-object dependency relationships may be specified in the called module's data. Other attribute data of common objects that is stored in the Object Values File will be updated according to the attribute specifications of the called module, as part of its normal processing.

For example, suppose an object is a screen object in the calling module, and it fires and acquires the value "XYZ" In the called module, this same object might be a conclusion object. If it fires in the called module, its initial value in that context is still "XYZ", but the alternative values for the object as a conclusion will be processed, perhaps changing its value to "ABC". The called module will update the Object Values File to reflect this new value, and will also update the object type attribute in that file to note that this object is a conclusion.

After processing is complete in the called module, program control returns to the calling module. At that time the calling module's Generated Data File is reopened, and the Statement and Object Queue Arrays, Control Strings and other memory variables for the calling module are reinstated from the file saved to disk. A comparison is then made between the Object Values File and the copy of the file that was made at the time of the call. The values of objects in the file are not disturbed, for typically the reason for calling the module in the first place was to acquire different values for one or more common objects as a result of the called module's processing. Other attribute data that is stored in the Object Values File, however, is restored to its original state, to match the attribute specifications of the calling module. In the example just given, the value of the common object upon return to the calling program will be its updated value, "ABC". The object type attribute stored in the Object Values File, however, is changed back to reflect the fact that this object is a screen object in the calling module, rather than a conclusion.

Processing then resumes normally in the calling module. The Object Values File will now contain updated values for objects that are common to the two modules, and will also contain additional records for objects that are members of the called module only. These extra object records are ignored in the subsequent processing of the calling module and do not affect its analysis in any way.

When another module is called in this manner and updates the value of objects common to both modules in the Object Values File, followed by a return of control to the calling module, the practical effect is a "blackboard" system of cooperating expert systems which share knowledge through the values of the common objects.

(4) Event-driven applications

Monitoring, reactive, and other event-driven applications are supported by establishing conceptual "threads" in the overall list of objects, based on inter-object dependency relationships. A thread is a continuous sequence of objects that forms a conceptually coherent subset of the overall object list, and constitutes a section of the Object Firing Control String 20. An object at the beginning of a thread is called the "thread initiator" object, and the final object in the thread is the "thread terminator" object.

An external monitoring routine waits for certain conditions to arise, then resets the object counter to the initiator object for the appropriate thread. The system then processes objects normally for the length of the thread, observing object sequence, firing applicable objects and taking appropriate actions, and after processing the terminator object of the thread, returns control to the monitoring routine. Such an design, for example, might be appropriate for monitoring pressure valves in a hydraulic system. Threads could be allowed to overlap, where objects are common to more than one thread. Such an arrangement is possible because objects are ordered and processed according to their inter-object dependency relationships, as determined by their relevance criteria.

Certainty Factors

Certainty factors qualify the applicability of criteria and object values by providing a measure of likelihood or confidence that a given condition is true, thereby supporting to some extent reasoning under conditions of uncertainty. A system supporting the use of certainty factors, for example, might conclude a given fact's value with an 80% level of confidence, and another fact's value with only a 50% level of confidence. Several algorithms exist for combining certainty factors when such factors interact, to produce a new, composite certainty factor for a resulting value.

Many, perhaps most, expert system applications do not require certainty factors. When solving problems, experts use them in some situations to evaluate degrees of belief or likelihood. Most of the time, however, the algorithms involved in combining certainty factors are too complex for an expert to use in practice, and the mere fact that uncertainty exists becomes an additional fact that is evaluated with 100% confidence together with other facts in the analysis. Also, expert systems are frequently designed not to evaluate and deal with uncertainty, but to eliminate it. Thus an expert system application in a business setting may enforce company policies predictably and uniformly by encoding the requirement that "if this condition of uncertainty exists, then always do the following".

This reveals an important distinction when thinking about reasoning under conditions of uncertainty. Uncertainty can be represented directly in a system and reasoned about with no uncertainty in the reasoning process, or it can be represented indirectly by encoding knowledge as if it were certain and then adjusting the reasoning process to reflect uncertainty about the applicability of the encoded knowledge.

For example, compare the assertion "There is a 60% chance of rain tomorrow", asserted with a 100% confidence level, with the assertion "It will rain tomorrow", asserted with a 60% confidence level. The first assertion represents uncertainty directly, and there is no ambiguity about it. Other elements in the system may use it and reason about it with full confidence that it applies. The second assertion represents uncertainty indirectly, by making an unambiguous statement, but the assertion is qualified with a certainty factor to indicate that it may not be correct.

The invention supports both alternatives for representing uncertainty. The first method relies on the inherent meaning of an object to represent uncertainty, while firing the object under specified conditions with 100% confidence that the object should be fired. A conclusion object may fire and conclude that "X is uncertain", and the system can then use that fact in its analysis. Knowledge about what the system should do if this object is applicable, i.e. under conditions where "X" is uncertain, is encoded in the relevance and action criteria of other objects, whose behavior may be affected by this condition.

The second method for representing uncertainty employs certainty factors directly, in several contexts of the knowledge base. Certainty factors can be assigned directly (e.g., "80%"), or may be derived by evaluating an expression.

(1) A certainty factor can be assigned as an attribute of an object, and when the object fires and acquires a value, this certainty factor is stored in the Object Values File 30.

(2) Certainty factors can be assigned to the values that conclusion objects may acquire, to say in effect: "under these conditions, fire this object and give the resulting value the following certainty factor". This allows different certainty factors to be assigned to different alternative values of the same object.

If a given value should be concluded with a different certainty factor under different conditions, the value is repeated as a separate alternative value for the object, with its own dedicated set of action criteria. The resulting effect is to say: "under these conditions, conclude this value for the object with a 90% confidence level, but under these conditions conclude that same value with only a 60% confidence level".

(3) Criteria statements can acquire certainty factors as a result of the combined certainty factors of objects referenced in them, and each statement in a set of criteria can be assigned a certainty factor threshold, to say in effect: "in order to evaluate to true, this statement must have a certainty factor of at least 75%". The same statement could be re-used in the context of another object's criteria, using a different certainty factor threshold.

(4) A statement may make an explicit evaluation of an object's certainty factor by employing the CF() function, a function in the Object Processing Program, which returns an object's certainty factor, as recorded in the Object Values File. For example, a statement might read:

CF (OBJECT_12)>.8

This statement would evaluate to "true" if the certainty factor of OBJECT_12 is greater than 80%.

Validation Table Generator

Inter-object dependency relationships also allow a means of verifying and demonstrating that an expert system is behaving correctly, i.e. consistently with its defined relevance criteria. Because the criteria represent and provide for all factors which can affect an object, and since the firing behavior of objects can be measured, validation tables and test cases can be constructed to monitor and prove the behavior of each object in the system.

For this purpose, the invention includes a Validation Table Generator 5. In a validation table created by this program 11, the table itself tests one enabling pathway of an object. Each of the factors that can affect the behavior of the object are listed down the left side of the table (see FIG. 12). Each column of the test table contains a fact situation involving these factors, created by a particular test case, which is given a test case number at the top of the column. The table is divided into a left-hand portion which tests the failure of the object to fire, and a single, final column on the right-hand side which tests the firing of the object. In each of the left-hand columns, all factors of the pathway should be enabled except for one (a different factor in each column should be disabled). Since all of the factors represented within a pathway for an object must be satisfied in order for the pathway to succeed, in the test cases for each of these columns, the object should not fire, and it should not fire because one and only one of the factors is disabled. In the final column of the table, all factors should be enabled, and the object should fire.

Since a given test case will involve the processing of all objects in the system, and only a few objects will affect a given pathway, test cases may be re-used from table to table. The result of creating tables for every pathway of every object in the system will be a minimized collection of test case scripts which can be fed into the system, and the firing behavior of objects can then be checked against the behavior predicted by the test tables. In this fashion, mistakes in the specification of criteria can be checked for, and the correct operation of the system can be demonstrated empirically. Because the relevance criteria are stored in the knowledge base, the creation of test tables and test cases, and the processing of the test case scripts, can all be automated.

Alternative Embodiments

Three alternative embodiments of the invention have been devised, in addition to the preferred embodiment disclosed above. These are alternatives for the organization and implementation of the system which is generated from the knowledge base, and which actually performs the expert system's function. Each is described below.

(1) Code generation

A conventional computer program is generated, in which statements of computer code are generated for each object in the knowledge base, in the order of the defined object sequence. The main body of the program consists of the objects' relevance criteria, separated into distinct enabling pathways, and constructed as a series of nested "if" statements built from the criteria statements. Thus if a pathway for an object consisted of three statements (A, B and C), then the generated code would read:

```
IF <statement A>
    IF <statement B>
        IF <statement C>
            <statements to fire the object>
        ENDIF
    ENDIF
ENDIF
```

If a particular "if" statement fails, program control will drop to the end of this block of nested statements, bypassing further evaluation of statements in that pathway.

Object values, when acquired, are stored in memory variables using the object name as the name of the variable. Lines of generated "if" statements use these same names to refer to the object's value. The result is that each "if" statement is directly executable, because memory variables exist for each object statement. All memory variables to hold object values are created and initialized at the start of processing, in order to provide for references to objects that do not fire.

The data type of each object's expected value must be considered when generating this code and when initializing object memory variables. Variables for objects containing character data are initialized to the null string (""), and generated code for character string comparisons must embed quotation marks correctly. For example, a line of code might be generated as:

IF OBJECT_19="YES"

A memory variable named OBJECT 19 will be created at system startup and will be initialized to the null string. Note also the quotation marks around the literal string YES.

Similarly, variables for objects of numeric data type are initialized to zero, logical data types initialized to false, and date types initialized to a null date (" / / ").

Because code is generated in the order of object sequence, references to other objects' values in a given object's generated code will be meaningful. The referenced objects will have been processed, and their values acquired, prior to the program's execution of code which references their values. Default values may be assigned either initially, or upon passing the object's generated code. If the set of nested "if" statements all succeed, then program control will reach the code generated at the heart of the code block. These statements will initiate appropriate action for the object's firing. If action criteria are involved for the object—for example, criteria governing the importation of data, the appearance of a given option on a menu, or a conclusion's value—appropriate subroutines containing similar generated code are called. If the object is a screen object, a general purpose procedure is called to handle the screen interface and acquire a value for the object. Similarly, general-purpose subroutines are called to handle the concluding of values for internal conclusion objects, the posting of messages to the user, and the writing out of data to an external file.

Code is also generated to handle requests by a user to interrupt processing, and to handle other common events in the processing of the system.

In practice, this implementation can be extremely fast, but it also encounters several difficulties. The amount of generated code for a large system can be exceptionally large, and may be too large to fit in a processor's available memory, causing system crashes. This is largely because no reuse of statement code is possible: wherever a statement is used in the system, its line of generated code must be reproduced, rather than looking to a common pool of statement code in which each statement's generated code is stored only once.

Furthermore, since every object is associated with a memory variable, and the contents of these variables can in some cases be lengthy strings of text, total system memory resources can be exhausted in the course of processing.

Finally, effective program control in such an implementation is difficult to achieve, as illustrated in two contexts. First, a common situation in expert systems is that a user will wish to go back to an earlier object and change an answer. To accommodate this situation in this implementation, the processing of objects must be interrupted, program control must return to an outside loop, processing must begin again at the top of the main body of the program, processing must then bypass all objects preceding the object of interest, yet stop at the appropriate object and reprocess it. This extra processing can take a long time, and considerable code must be generated around the basic blocks of nested "if" statements in order to handle such situations correctly.

Another context which presents a difficult problem for program control has to do with the nature of the problem being solved. Problems involving the monitoring of situations and reactive responses do not lend themselves to such predetermined, procedural code. In such cases, the system must be flexible enough to go directly to an appropriate set of objects and process them as a subset of the whole knowledge base, and then return to its monitoring state. In the preferred implementation, program control can be directed simply by assigning a new object sequence number to the variable that holds the number of the object currently being processed, and processing then resumes from that object.

(2) Data-driven analysis

In another embodiment, data rather than code is generated. This data is stored as records in a file (the "master" file) in a relational database on a fixed disk, and processing occurs by driving through this data until the end of the data file is reached. Data is organized in object sequence. Each data record consists of an encoded criteria statement and pathway information. Within each object, statements are organized by pathways and by statement position within pathways. A composite index key is built, holding the object sequence number, criteria path number, and statement position number within each pathway.

When driving through the master file, the beginning of a new object is evidenced by a change in the object sequence number. Consideration begins of the object's first criteria pathway. Each statement record is examined in turn, until a new pathway number is encountered If a statement evaluates to "false" records in the file are skipped until a new pathway or new object is encountered. Each statement record contains a statement identifier. A relation is set using this identifier into another file (the "resource" file), indexed by statement identifier, in which the generated code for each statement is stored. As each statement in the master file is evaluated, the line of generated code for the statement is retrieved from the resource file and evaluated for truth. Object values are stored in an Object Values Data file, and are retrieved and used as needed in order to evaluate statements.

A relation is also set from the master file into the objects file which holds all objects and their attributes, using the statement identifier as an index and relational key. If a pathway succeeds, general-purpose subroutines are called to extract the appropriate attributes from the objects file and process the object.

Criteria evaluation in this implementation is thus transformed from an evaluation of generated "if" statements to an examination of data records in a data file. Memory problems, for both program size and for the storage of object values in memory variables, are greatly eased. Statement code is reused, in that it is stored only once, in the resource file, and all statement references by master file records are in the form of pointers. Further, more program control is gained, because the record pointer in the master file can be directly manipulated, which cannot be accomplished with the execution of conventional program code in the first implementation. For example, to go back to an earlier object and reprocess it, the record pointer is simply repositioned in the file to the start of the appropriate object's records, and processing resumes from that point.

Despite these advantages, however, this implementation can suffer from predictable performance problems. In a large application, large numbers of data records will be generated, and system performance can be hampered by the frequent interactions with the disk drive that are required in order to access the data. Performance also suffers from the continual need to update relational pointers among the different data files. These problems may be addressed to some extent through the use of faster and more powerful hardware, and the use of disk caching, but they cannot be eliminated altogether.

(3) Hybrid approach: Generated data and generated subroutines

This approach uses a combination of the above two implementations. Program control is handled by the use of data files, as in the second implementation, but for the consideration of object criteria, generated subroutines are called. For each object during system generation, a dedicated subroutine is generated which holds the code for the statements to be evaluated, and which returns a result indicating whether the object should fire, based on the execution of the generated code. Also, some attribute data is assigned by the subroutine to common system memory variables. (For example, the system memory variable T would hold the text of the current object being processed.) The name of the object's subroutine is some variant of the object's name. During processing, object records in a data file (one record per object) are examined in object sequence, and their appropriate subroutines are called to determine if the object fires, and to acquire necessary attribute data.

This implementation succeeds in combining the best features of the first two implementations. Program control is maintained by considering objects in a data file, and repositioning the record pointer as needed. Performance is facilitated by using generated "if" statements rather than data records for criteria evaluation, and assigning attribute data to variables in a procedure, to avoid retrieval of such data from the objects file.

Despite these advantages, some performance problems remain. Large amounts of program code are still generated in the dedicated object subroutines, for again no reuse of statement code is possible. The system still has potentially large data files, with resultant hardware performance limitations, and a relational pointer from the master file into the objects file is still necessary for some attribute data.

Finally, in all three alternative implementations, the advantages of the preferred embodiment's pointer-based approach are not enjoyed. All objects are evaluated at the time they are reached in the processing sequence. In the preferred implementation, only those objects and statements which can be affected by acquired values are evaluated, resulting in significant improvements in efficiency.

I claim:

1. A computing system including a processor and a data set, the data set comprising a plurality of objects, each object having:
   (a) a data field which may contain a value, the value of the object, which value may be set to one of a plurality of possibilities by the processor,
   (b) a relevance criterion which may be evaluated by the processor to yield a logical true or a logical false, and
   (c) an action, in the form of processor instructions or a pointer to processor instructions, which will be executed by the processor if evaluation of the relevance criterion by the processor produces a logical true; and
   (d) in one or more of the objects, the action of the object instructs the processor to set the value of the object to one of the plurality of possibilities, and,
   (e) in one or more of the objects, the relevance criterion includes a reference to the value of another object such that the relevance criterion will or will not be satisfied depending on the value of the other object.

2. The computing system of claim 1 in which the action of an object comprises making a change to another object.

3. The computing system of claim 2 in which the change to another object is a change in the relevance criterion of the other object.

4. The computing system of claim 3 wherein the data set has a specified sequence of the objects beginning with a first object and ending with a last object, in which sequence the relevance criterion of each object makes no reference to the value of a later object in the sequence.

5. The computing system of claim 4 in which the change to another object changes the sequence of the objects.

6. A computer method for performing a computation, by use of a processor, on a data set comprising a plurality of objects, each object having:
   (a) a data field which may contain a value, the value of the object, which value may be set to one of a plurality of possibilities by the processor,
   (b) a relevance criterion which may be evaluated by the processor to yield a logical true or a logical false, and
   (c) an action, in the form of processor instructions or a pointer to processor instructions, which will be executed by the processor if evaluation of the relevance criterion by the processor produces a logical true;
   the method having steps comprising:
   (d) determining the value of a first object,
   (e) evaluating the relevance criterion of a second object, which relevance criterion includes a dependency on the value of the first object, and
   (f) if the relevance criterion of the second object is satisfied, executing the action specified by the object and setting the value of the object.

7. The computer method of claim 6 in which the action of an object comprises making a change to another object.

8. The computer method of claim 7 in which the change to another object is a change in the relevance criterion of the other object.

9. The computer method of claim 8 wherein:
   the data set has a specified sequence of the objects beginning with a first object and ending with a last object, in which sequence the relevance criterion of each object makes no reference to the value of a later object in the sequence.

10. The computer method of claim 9 in which the change to another object changes the sequence of the objects.

11. A computing system including means for creating or changing a data set which may be processed on a computing system with a processor, the data set comprising a plurality of objects, each object having:
    (a) a data field which may contain a value, the value of the object, which value may be set to one of a plurality of possibilities by the processor,
    (b) a relevance criterion which may be evaluated by the processor to yield a logical true or a logical false, and
    (c) an action, in the form of processor instructions or a pointer to processor instructions, which will be executed by the processor if evaluation of the relevance criterion by the processor produces a logical true; and
    (d) in one or more of the objects, the action of the object instructs the processor to set the value of the object to one of the plurality of possibilities, and,
    (e) in one or more of the objects, the relevance criterion includes a reference to the value of another object such that the relevance criterion will or will not be satisfied depending on the value of the other object.

12. The computing system of claim 11 in which the action of an object comprises changing the relevance criterion of another object.

13. The computing system of claims 12 wherein the data set has a specified sequence of the objects beginning with a first object and ending with a last object, in which sequence the relevance criterion of each object makes no reference to the value of a later object in the sequence and the action of one or more objects changes the sequence of the objects.

14. A computing system for generating validation tables from a data set which may be processed on a computing system with a processor, the data set comprising a plurality of objects, each object having:
 (a) a data field which may contain a value, the value of the object, which value may be set to one of a plurality of possibilities by the processor,
 (b) a relevance criterion which may be evaluated by the processor to yield a logical true or a logical false, and
 (c) an action, in the form of processor instructions or a pointer to processor instructions, which will be executed by the processor if evaluation of the relevance criterion by the processor produces a logical true; and
 (d) in one or more of the objects, the action of the object instructs the processor to set the value of the object to one of the plurality of possibilities, and,
 (e) in one or more of the objects, the relevance criterion includes a reference to the value of another object such that the relevance criterion will or will not be satisfied depending on the value of the other object;
 the computing system comprising:
 (f) instructions for reading the contents of an object, and
 (g) instructions for generating a validation table from the contents of the object.

15. The computing system of claim 14 in which the action of an object comprises changing the relevance criterion of another object.

16. The computing system of claim 15 wherein the data set has a specified sequence of the objects beginning with a first object and ending with a last object, in which sequence the relevance criterion of each object makes no reference to the value of a later object in the sequence and the action of one or more objects changes the sequence.

17. A computing system for interpreting into natural language the contents of a data set which may be processed on a computing system with a processor, the data set comprising a plurality of objects, each object having:
 (a) a data field which may contain a value, the value of the object, which value may be set to one of a plurality of possibilities by the processor,
 (b) a relevance criterion which may be evaluated by the processor to yield a logical true or a logical false, and
 (c) an action, in the form of processor instructions or a pointer to processor instructions, which will be executed by the processor if evaluation of the relevance criterion by the processor produces a logical true; and
 (d) in one or more of the objects, the action of the object instructs the processor to set the value of the object to one of the plurality of possibilities, and,
 (e) in one or more of the objects, the relevance criterion includes a reference to the value of another object such that the relevance criterion will or will not be satisfied depending on the value of the other object;
 the computing system comprising:
 (f) instructions for reading the relevance criterion and action of one of the objects, and
 (g) instructions for interpreting the relevance criterion and action into natural human language, and
 (h) instructions for adding one or more natural human language words to make one or more complete natural human language sentences.

18. The computing system of claim 17 in which the action of an object comprises changing the relevance criterion of another object.

19. The computing system of claim 18 wherein the data set has a specified sequence of the objects beginning with a first object and ending with a last object, in which sequence the relevance criterion of each object makes no reference to the value of a later object in the sequence and the action of one or more objects changes the sequence.

20. A computing system for examining a data set which may be processed on a computing system with a processor, the data set comprising a plurality of objects, each object having:
 (a) a data field which may contain a value, the value of the object, which value may be set to one of a plurality of possibilities by the processor,
 (b) a relevance criterion which may be evaluated by the processor to yield a logical true or a logical false, and
 (c) an action, in the form of processor instructions or a pointer to processor instructions, which will be executed by the processor if evaluation of the relevance criterion by the processor produces a logical true; and
 (d) in one or more of the objects, the action of the object instructs the processor to set the value of the object to one of the plurality of possibilities, and,
 (e) in one or more of the objects, the relevance criterion includes a reference to the value of another object such that the relevance criterion will or will not be satisfied depending on the value of the other object;
 the computing system comprising:
 (f) instructions for reading information from the data set, and
 (g) instructions for determining what steps a computer would take upon execution of the actions specified by one or more of the objects.

21. The computing system of claim 20 in which the action of an object comprises changing the relevance criterion of another object.

22. The computing system of claim 21 wherein the data set has a specified sequence of the objects beginning with a first object and ending with a last object, in which sequence the relevance criterion of each object makes no reference to the value of a later object in the sequence and the action of one or more objects changes the sequence.

* * * * *

UNITED STATES PATENT AND TRADEMARK OFFICE
CERTIFICATE OF CORRECTION

PATENT NO. : 5,418,888
DATED : May 23, 1995
INVENTOR(S) : John L. Alden

It is certified that error appears in the above-indentified patent and that said Letters Patent is hereby corrected as shown below:

On title page, item [54] and Col. 1, line 1,

In the title delete

"SYSTEM FOR REVELANCE CRITERIA MANAGEMENT OF ACTIONS AND VALUES IN A RETE NETWORK" and replace with --SYSTEM FOR RELEVANCE-ACTIONS-VALUE BASED PROGRAMMING--.

Signed and Sealed this

Sixteenth Day of January, 1996

Attest:

BRUCE LEHMAN

*Attesting Officer*  *Commissioner of Patents and Trademarks*